(12) United States Patent
Grubish et al.

(10) Patent No.: US 7,263,265 B2
(45) Date of Patent: Aug. 28, 2007

(54) CONVERTIBLE FIBER CLOSURE PLATFORM

(75) Inventors: Christopher S. Grubish, Solon, OH (US); Randy G. Cloud, Mentor, OH (US); Keith A. Miller, Twinsburg, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 11/438,801

(22) Filed: May 23, 2006

(65) Prior Publication Data

US 2006/0222309 A1   Oct. 5, 2006

(51) Int. Cl.
*G02B 6/00* (2006.01)

(52) U.S. Cl. ..................................... 385/135

(58) Field of Classification Search ................. 385/135
See application file for complete search history.

(56) References Cited

U.S. PATENT DOCUMENTS

| | | | | |
|---|---|---|---|---|
| 5,093,885 A | * | 3/1992 | Anton | ......................... 385/134 |
| 5,793,921 A | * | 8/1998 | Wilkins et al. | ............. 385/135 |
| 5,884,000 A | * | 3/1999 | Cloud et al. | ................. 385/135 |
| 5,892,870 A | * | 4/1999 | Fingler et al. | ................. 385/59 |
| 6,201,921 B1 | * | 3/2001 | Quesnel et al. | ............. 385/135 |
| 6,215,939 B1 | | 4/2001 | Cloud | |
| 6,385,381 B1 | * | 5/2002 | Janus et al. | .................. 385/135 |
| 6,621,975 B2 | * | 9/2003 | Laporte et al. | ............. 385/135 |
| 2003/0211778 A1 | * | 11/2003 | Burris et al. | ................. 439/587 |
| 2005/0163448 A1 | * | 7/2005 | Blackwell et al. | .......... 385/135 |
| 2005/0175307 A1 | * | 8/2005 | Battey et al. | ............... 385/135 |

\* cited by examiner

*Primary Examiner*—Michelle Connelly-Cushwa
*Assistant Examiner*—Chris H. Chu
(74) *Attorney, Agent, or Firm*—Fay Sharpe LLP

(57) ABSTRACT

An optical fiber splice case particularly adapted for providing fiber optic links directly to a home, business, et al. is provided wherein at least one enclosure base has at least one cover member selectively sealingly engaged with at least one side of the at least one enclosure base. The at least one enclosure base includes at least one bulkhead having a selective plurality of optical fiber ports therethrough.

18 Claims, 21 Drawing Sheets

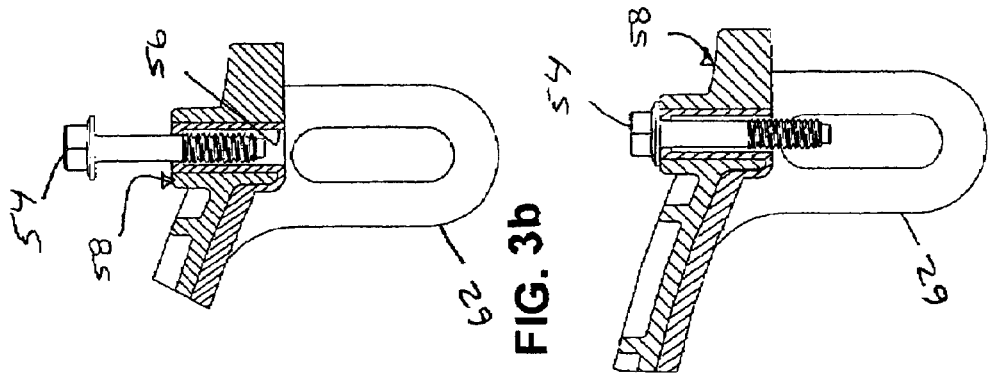
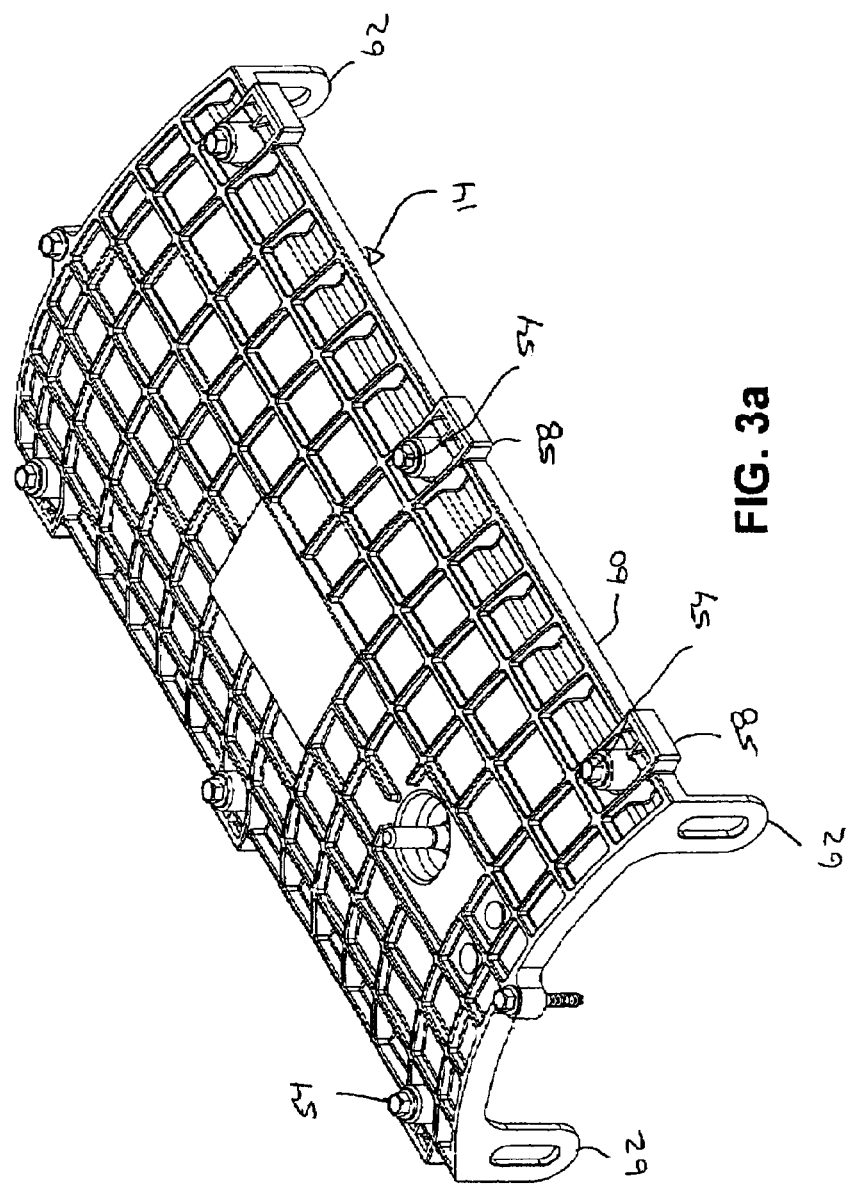

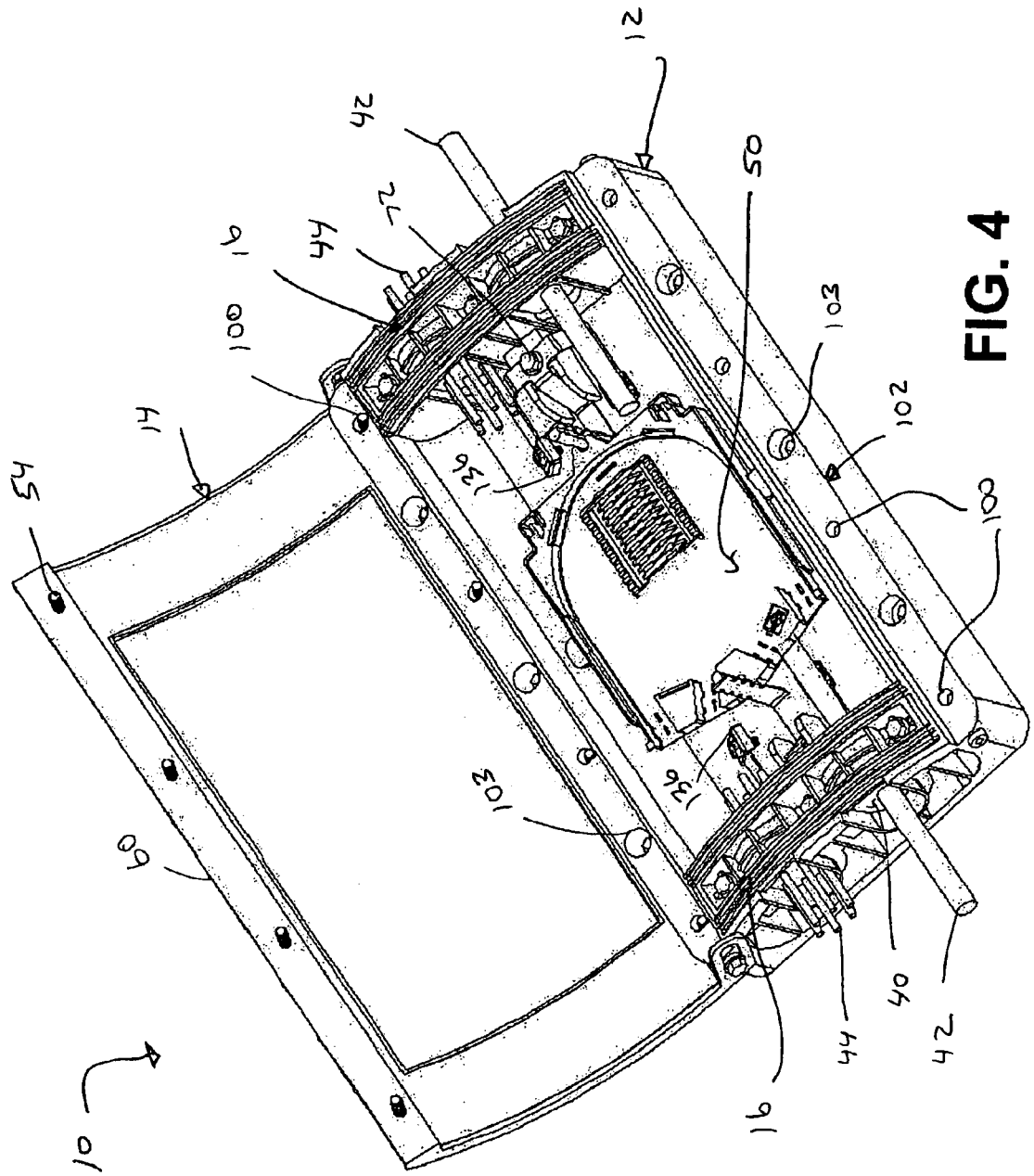

CONVERTIBLE FIBER CLOSURE PLATFORM

CROSS-REFERENCE TO RELATED APPLICATION

This application claims the priority benefit of U.S. application Ser. No. 11/126,740, filed May 11, 2005, the disclosure of which is incorporated herein by reference.

BACKGROUND OF THE INVENTION

The subject invention is directed to a convertible waterproof and airtight cable splice enclosure assembly. Assemblies of the type under consideration are particularly suited for enclosing and housing fiber optic cables such as loose buffer and unitube type cables and will be described with particular reference thereto. However, the apparatus could equally well be used with other types of cables or wires such as, for example, hybrid cables including copper wire, twisted pair wire or co-axial cables.

Many different types of fiber optic cable enclosures are known in the prior art. These prior enclosures are satisfactory to a greater or lesser degree but often have certain defects which make them inconvenient to use or prevent them from being readily adaptable to changing environments and conditions. One example of a optical fiber splice case that presents a significant improvement over the earlier devices found in the prior art is taught in U.S. Pat. No. 6,215,939, the teachings of which are incorporated herein by reference. In addition to providing improvements over the various prior art devices, the subject optical fiber splice case presents further significant new advances over the earlier apparatus as well.

Service providers (i.e. communication companies) are providing fiber optic links directly to a home, business, apartment, and even the farm. In order for service providers to keep their infrastructure costs low, a terminal enclosure must be provided to allow for ease of initial installation into service, and time savings for adding (linking) individual subscribers. Adding an individual subscriber is commonly referred to as providing a drop. Adding a drop in existing enclosure designs requires splicing on the fiber tray. This is achieved by removing an enclosure from its location and taking it into a temperature controlled environment. Highly skilled personnel then reenter the enclosure and use laser splicing equipment to add the new service (drop). While performing these tasks, any signals passing through the enclosure have the potential to be disturbed. This operation also requires the critical seals of the enclosure to be effected each time new service is added.

SUMMARY OF THE INVENTION

In accordance with one aspect of the invention, there is provided a convertible fiber splice enclosure including at least one enclosure base having a first cover member selectively sealingly engaged with at least one side of the at least one enclosure base. The at least one enclosure base includes a first bulkhead having a first plurality of spaced apart selectively removable webs defining a first set of ports therein for selectively receiving first incoming feed cables therethrough. The enclosure also includes a second bulkhead opposed to the first bulkhead. The second bulkhead has a second plurality of spaced apart selectively removable webs defining a second set of ports therein for selectively receiving second incoming feed cables therethrough.

In accordance with another aspect of the invention, there is provided an optical fiber splice case including at least one enclosure base having at least one cover member selectively sealingly engaged with at least one side of the at least one enclosure base. The at least one enclosure base includes at least one bulkhead member having a selective number of optical fiber ports therethrough.

In accordance with still another aspect of the invention, a convertible fiber splice enclosure is provided having a first enclosure base coupled to a second enclosure base. The enclosure further includes a first cover member selectively sealingly engaged with an exterior side of one of the first enclosure base and the second enclosure base. A second cover member is selectively sealingly engaged with an exterior side of another of the first enclosure base and the second enclosure base. At least one of the first and the second cover members includes selectively blocked ports for receiving connector housings therethrough.

In accordance with yet another aspect of the invention, an optical fiber splice case is provided including at least one enclosure base. The at least one enclosure base further includes at least one cover member having a plurality of fiber adapter ports adapted to sealingly receive fiber adapters. Each of the fiber adapters includes a fiber connector. The fiber connector and the splicing tray include a fiber jumper therebetween.

In accordance with still a further aspect of the invention, a method is provided for connecting fibers to a plurality of associated end users including the steps of, providing at least one fiber splice case having at least one hingedly retained cover member for accessing a splicing chamber and at least one bulkhead, providing the at least one bulkhead with a plurality of optical fiber ports, pivoting the at least one cover member and installing a feeder cable through the at least one bulkhead in the splicing chamber, feeding a selected number of drop wires through the fiber ports, and replacing the at least one cover member.

In accordance with yet a further aspect of the invention, a method is provided for connecting an optical fiber to a plurality of end users including the steps of, providing at least one optical fiber enclosure base having at least one hingedly retained cover member for accessing a chamber and at least one end plate, providing the at least one cover member with a plurality of fiber adapters, pivoting the at least one cover member and installing a feeder cable through at least one bulkhead in the chamber, the fiber adapters include connector couplers, connecting the fiber connectors on one side of the at least one cover with the splicing tray via a plurality of fiber jumpers, installing a plurality of dust covers on the other side of the at least one cover to the fiber adapters, replacing the at least one cover member, removing a selected number of dust covers from selected fiber adapters to expose a selected number of connector couplers, and attaching a selected number of drop wires to the selected connector couplers.

In accordance with still a further aspect to the invention an optical splice case is provided including a convertible fiber splice enclosure having at least one enclosure base and a first cover member selectively sealingly engaged with at least one side of the at least one enclosure base. The enclosure base includes a first bulkhead having a first plurality of spaced apart selectively removable webs defining a first set of ports therein. The enclosure base further includes a second bulkhead opposed to the first bulkhead and having a second plurality of spaced apart selectively removable webs defining a second set of ports therein. A plurality of selectively blocked ports is disposed on the first cover for receiving adapter housings for connecting to outgoing fiber cables.

Other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein:

FIG. 3a is a perspective view of the cover member;

FIG. 3b is an enlarged elevational view of the retention bolts securing a cover to the base in the retained position;

FIG. 3c is an enlarged elevational view of the retention bolts securing a cover to the base in the secured position;

FIG. 4 is a perspective view of a housing assembly according to a second version of the first embodiment of the present invention;

DETAILED DESCRIPTION

Figure 1:
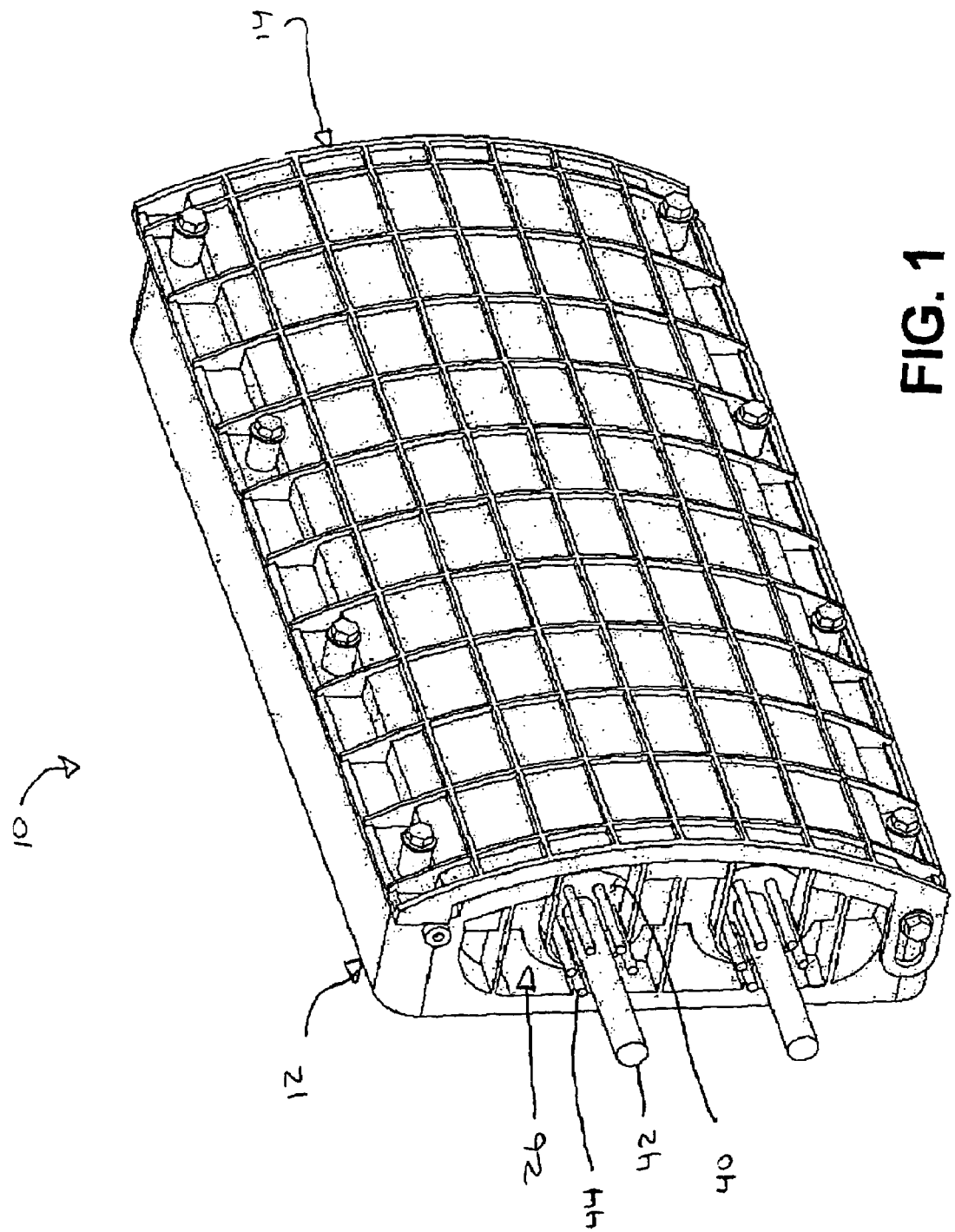
FIG. 1 shows a perspective view of a first embodiment of a housing assembly intended for use with fiber optic cable.

Referring now to the drawings wherein the showings are for the purposes of illustrating embodiments of the invention only and not for purposes of limiting same, the overall construction of the subject fiber (i.e. optical) splice case, housing or enclosure assembly 10, according to a first embodiment, can best be understood by reference to FIGS. 1-10. As illustrated therein, the splice case assembly housing 10 comprises an enclosure base or splice case 12, an enclosure cover member 14, and an end plate 16. The assembly housing 10 encloses a splice chamber or splice tray support area 20 and a drop chamber or a fiber jumper storage compartment 23 as shown. The housing assembly 10 formed by the cover member 14, enclosure base 12, and the end plate 16 are joined together in a sealed clamping relationship to define a somewhat flat truncated oval-shaped splice case volume area therein.

Although the housing body components and the end plates could be formed from a variety of different materials using different manufacturing techniques, in the subject embodiment, they are preferably injection molded from a suitable plastic, containing fibers for reinforcement. For example, fiber glass filled and reinforced polypropylene.

The enclosure base 12 includes a pair of bulkheads 26, 28 at opposing ends. The bulkheads 26, 28 include breakout webs 30 which can be selectively punched out from the bulkhead in order to create an opening or port 32 therethrough. The housing assembly 10 can be configured for butt or in-line configurations. For butt configurations, the closure cover 14 can be sealed against the enclosure base 12 without having an end plate 16 installed. For in-line configurations, the enclosure base 12 is adapted to receive end plates 16 at opposing ends which can be sealingly engaged with the cover member 14. The housing assembly 10, specifically the bulkheads 26, 28 of the enclosure base 12 are adapted to selectively receive a grommet 40 whereby incoming feed or feeder cables 42 and outgoing drop wires 44 can extend selectively through the same port or opening 32 through the bulkheads 26,28, or can extend through another opening through the bulkhead (FIG. 4).

Figure 2:
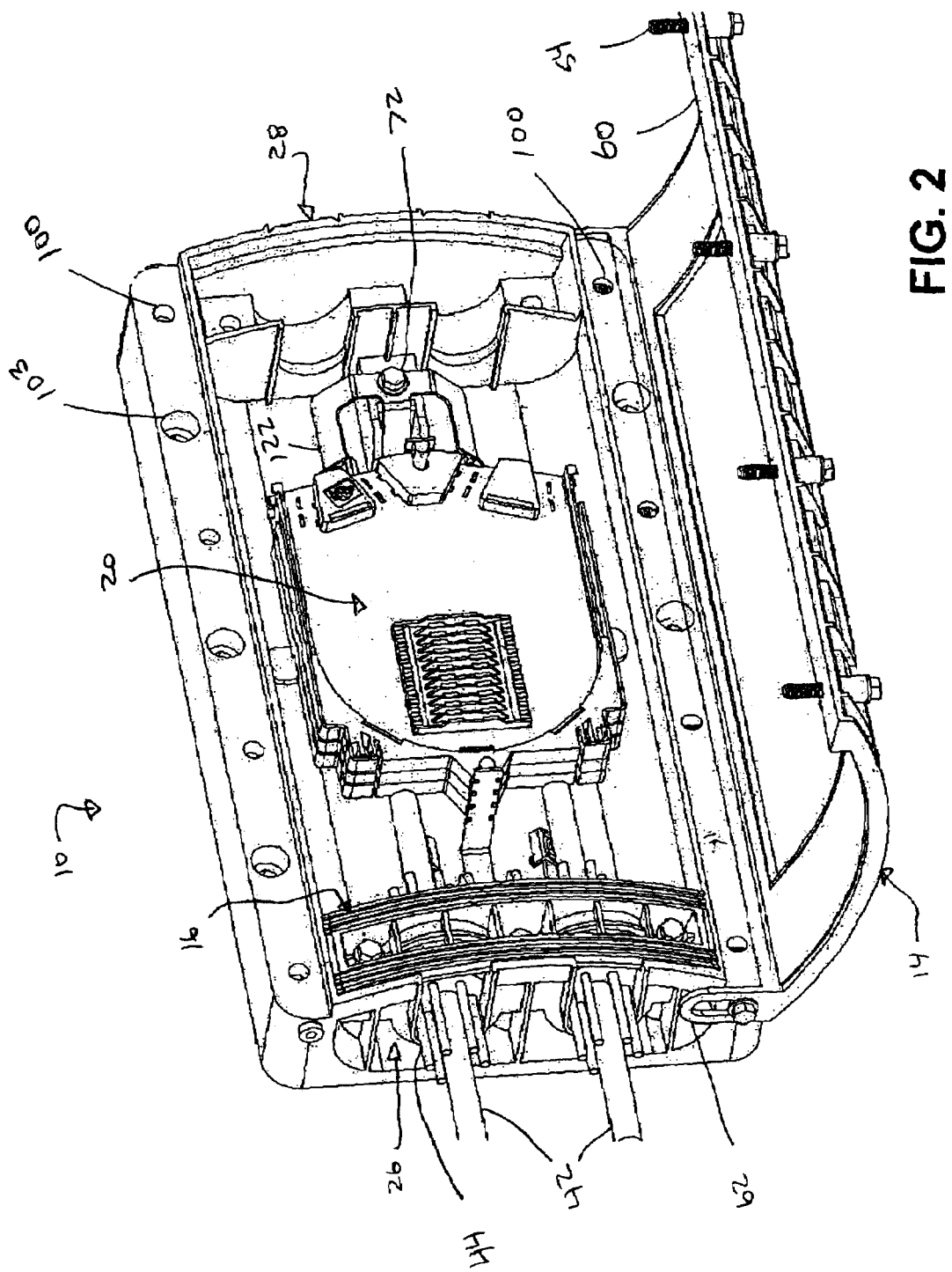
FIG. 2 is a perspective view of the housing assembly of FIG. 1 with a cover in the open position.

Referring now to FIG. 2, the enclosure base 12 can include a splice tray 50 therein. The cover member 14 can be pivoted relative to the enclosure base 12 whereby access to the splice tray 50 is facilitated. It is to be appreciated that the cover member 14 can be hinged and pivoted either to the left or to the right. Referring to FIG. 3, the cover member 14 can be secured to the enclosure base 12 with self-retaining mounting bolts 54. Retaining sleeves 56 allow the bolts 54 to be retained in bolt mounts 58 along an outer edge 60 of the cover 14 while moving in a position to enable the cover 14 to pivot about the enclosure 12. In FIG. 3, the cover member 14 is shown including bolts 54 for engaging with the enclosure base 12. The cover member 14 can also include a pair of hinge legs 62 (i.e. a pair on each side) which allow for the cover member 14 to remain attached to the enclosure base 12 after the mounting bolts 54 are disengaged from the enclosure base 12. It is to be appreciated that each pair of hinge legs 62 enable cover 14 to selectively pivot to one side or the other when bolts 54 are disengaged from base 12. Hinge legs 62 allow cover 14 to remain attached to base 12 after bolts 54 are disengaged from base 12.

Figure 6:
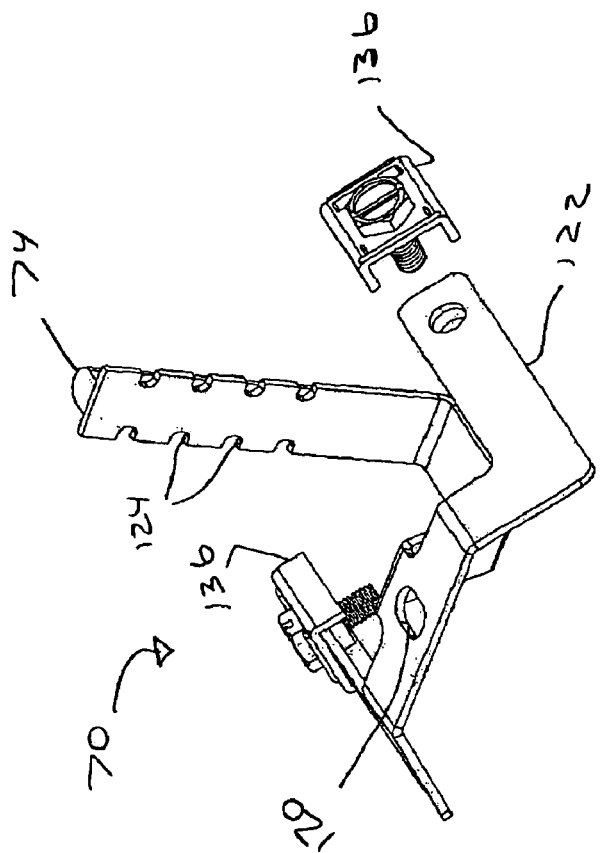
FIG. 6 is an enlarged perspective view of the restraint bracket.
Figure 5:
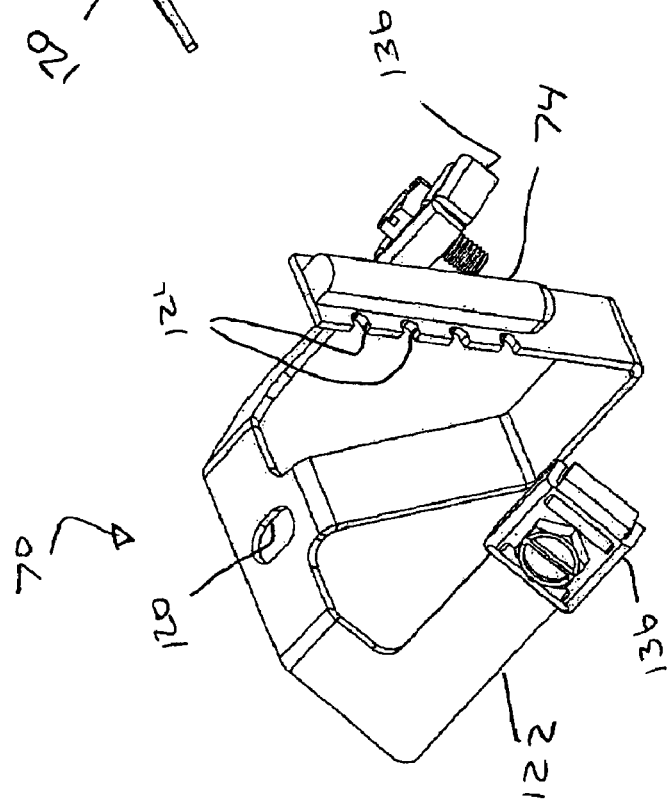
FIG. 5 is an enlarged perspective view of the restraint bracket.
Figure 8:
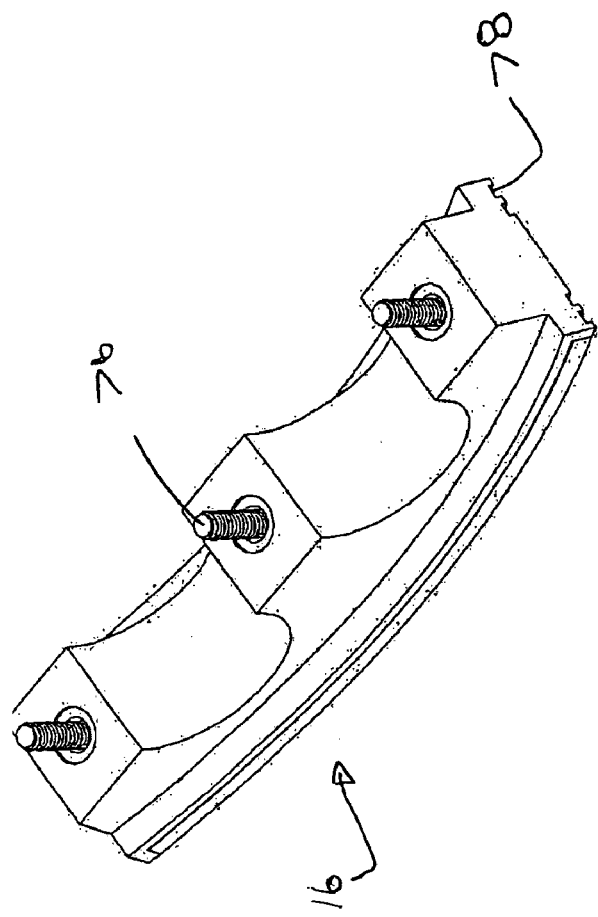
FIG. 8 is an enlarged bottom perspective view illustrating the end plate.

Referring now to FIGS. 5 and 6, the housing assembly 10 can include a pair of restraint brackets 70 for anchoring the feed cables 42. The restraint brackets 70 can include a self-tapping screw 72 for mounting to the enclosure base 12. The restraint brackets 70 also include support ribs 74 that can engage splice trays 50 to increase stability.

Figure 7:
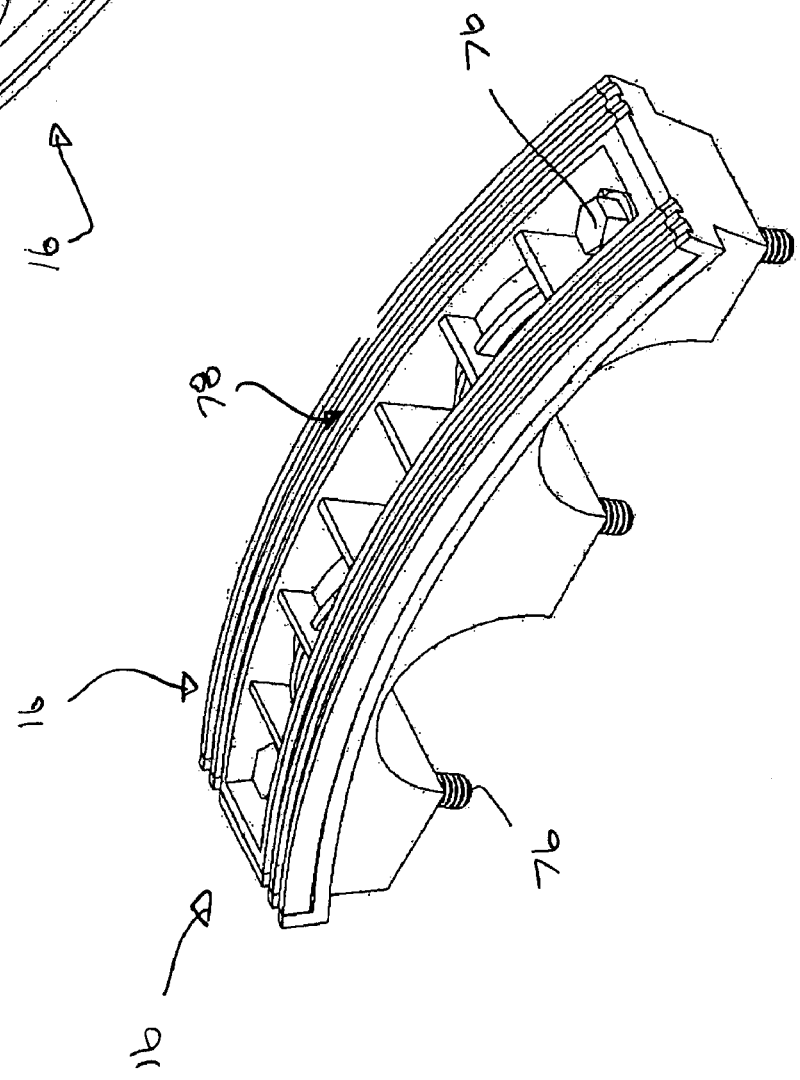
FIG. 7 is an enlarged top perspective view illustrating the end plate.

Referring again to FIGS. 2 and 4, the selective openings 32 through the bulkheads 26, 28 are adapted to receive grommets 40. The grommets 40 can be used for sealing incoming cables 42 or gel sealant can be wrapped around the incoming cables 42. The grommets 40 can include a plurality of openings therethrough capable of accommodating a selected combination of incoming feed cables 42 and outgoing drop wires 44. As shown in FIG. 7, the end plate 16 can be mounted with mounting bolts 76 to the enclosure base 12. The end plates 16 include sealing beads 78 to imbed into a gasket on the interior of the cover surface thereby sealingly engaging the grommets 40. The enclosure base 12 also can include a tray support or storage bracket 80. The storage bracket includes a retention post. The storage bracket 80 can pivot around the retention post 82 to allow fiber to be captured below the storage bracket 80.

Referring now to FIG. 4, an in-line configuration of the housing assembly 10 is shown. The in-line configuration includes incoming feed cables 42 and outgoing fiber drops 44 passing through both bulkheads 26, 28 of the enclosure base 12. It is to be appreciated that end plates 16, best shown in FIGS. 7 and 8, can be installed at each end of the enclosure base 12 over the respective bulkheads 26, 28.

Figure 9:
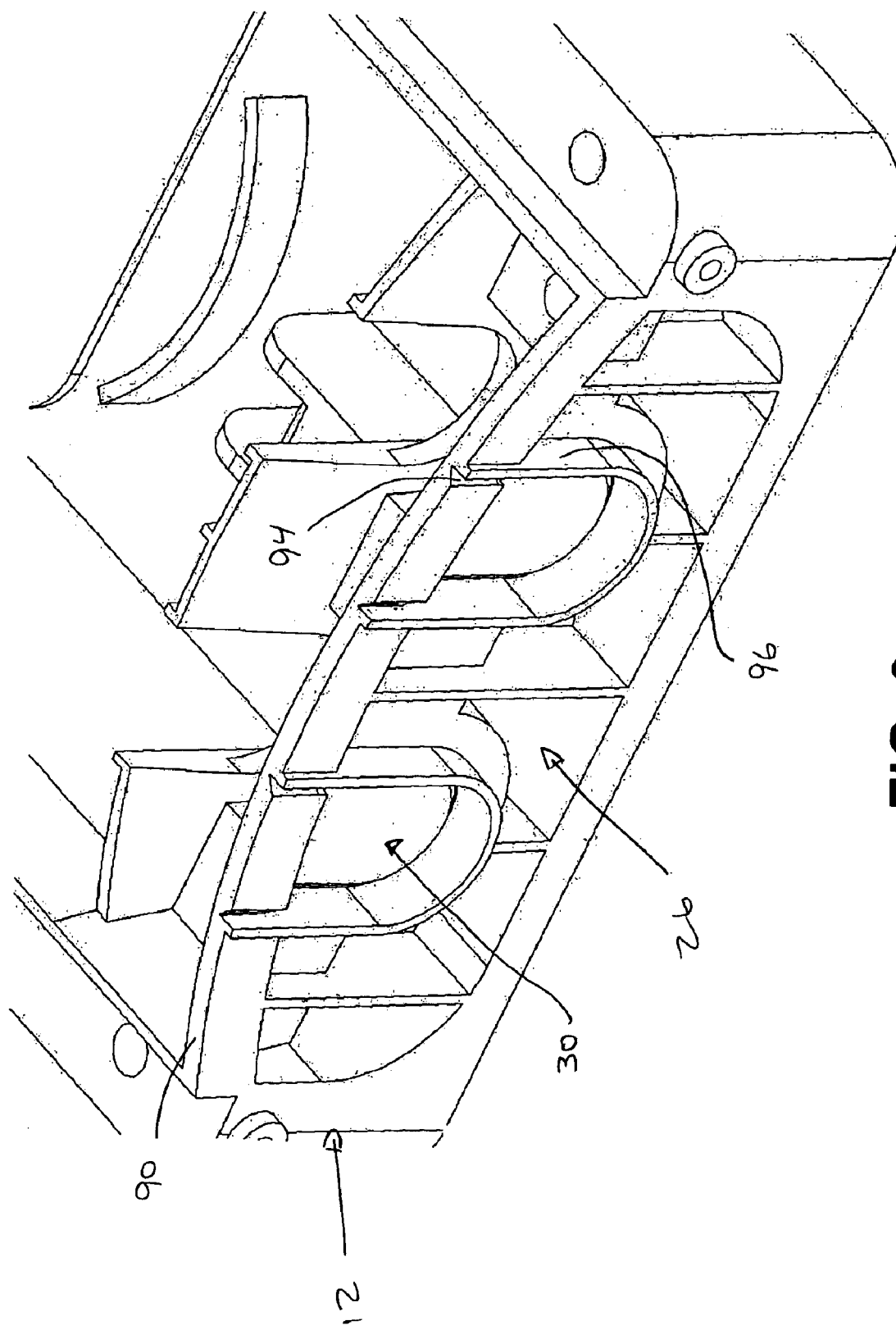
FIG. 9 is an enlarged front perspective view illustrating the bulkhead of an enclosure base.

Referring to FIG. 9, bulkhead 26 is there displayed. A perimeter rib surface 90 seals against the cover to eliminate the end plate in a butt application. If access is desired through one or both ends of the enclosure base 12, break out walls or webs 30 are selectively removed from the bulkhead 26. A V-groove 94 around the perimeter of the break out web 30 creates a thin section conducive for breaking out the wall of the web 30. Ribbed walls 96 around the break out web 30 reinforce the structure so that it does not break when the wall 30 is removed. It is to be appreciated that break out webs 30 can be left in place until needed.

Figure 10:
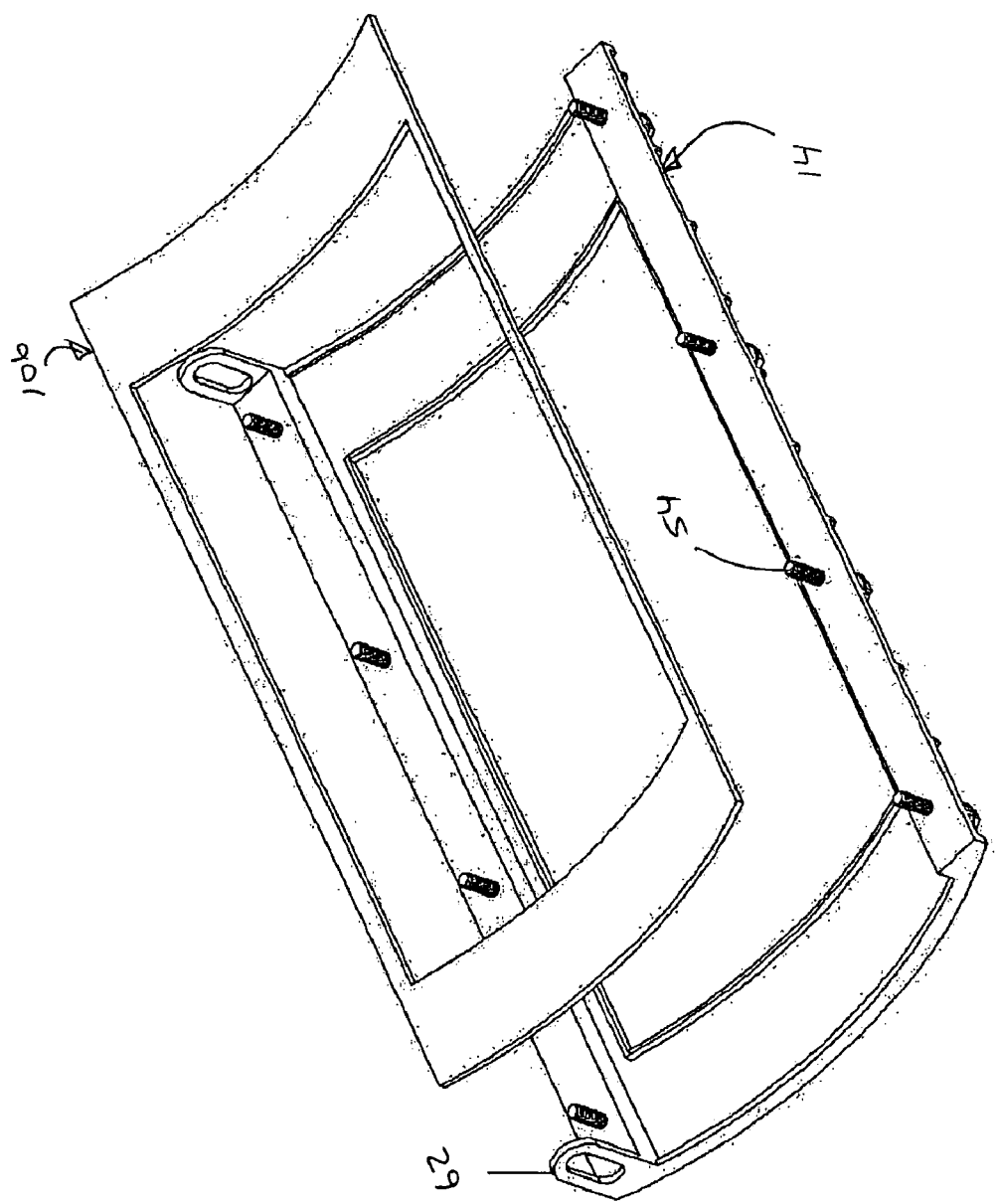
FIG. 10 is a bottom perspective view of the cover member according to the first embodiment of the housing assembly.
Figure 11:
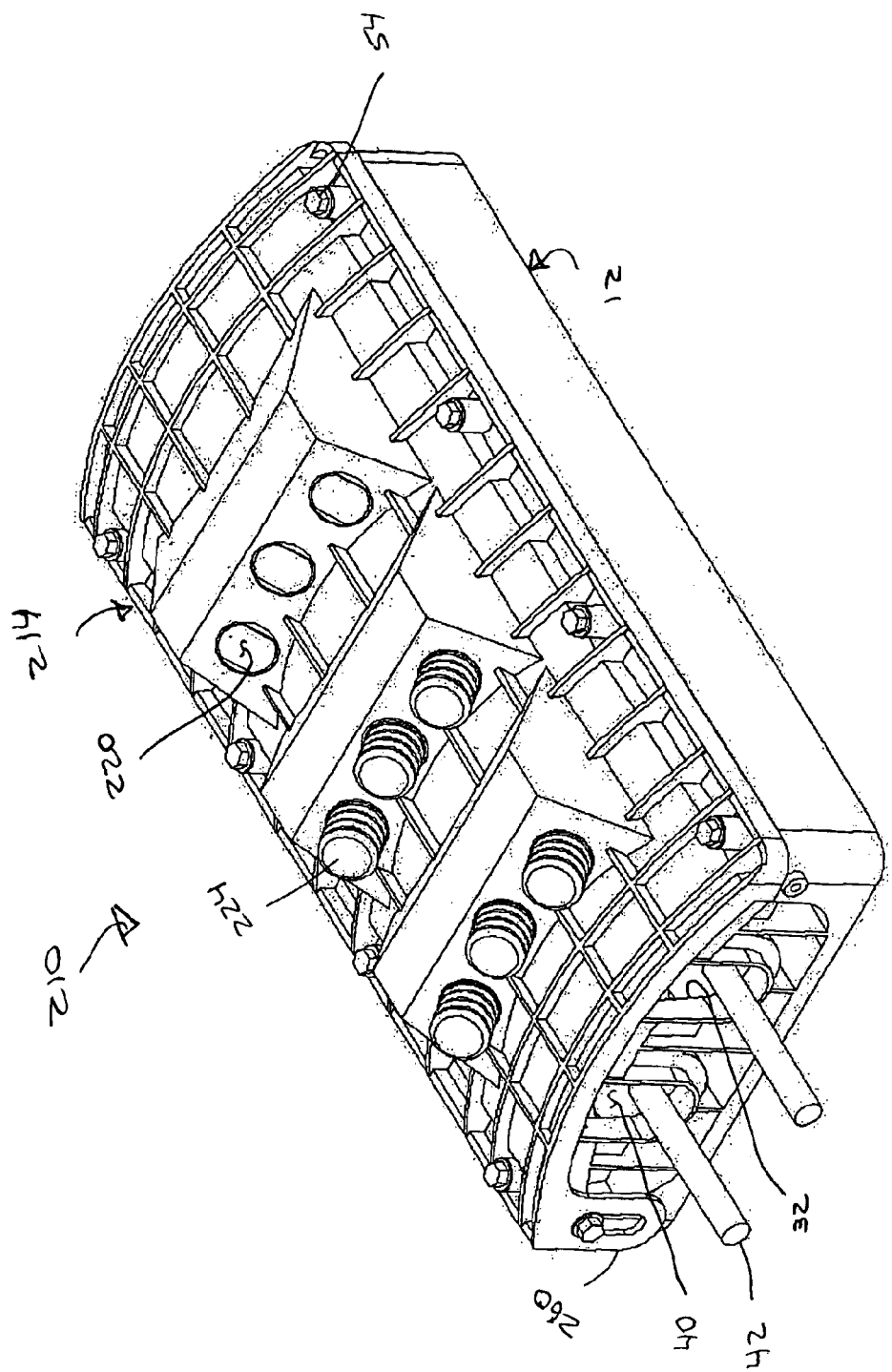
FIG. 11 shows a perspective view of a second embodiment of a housing assembly intended for use with fiber optic cable.
Figure 12:
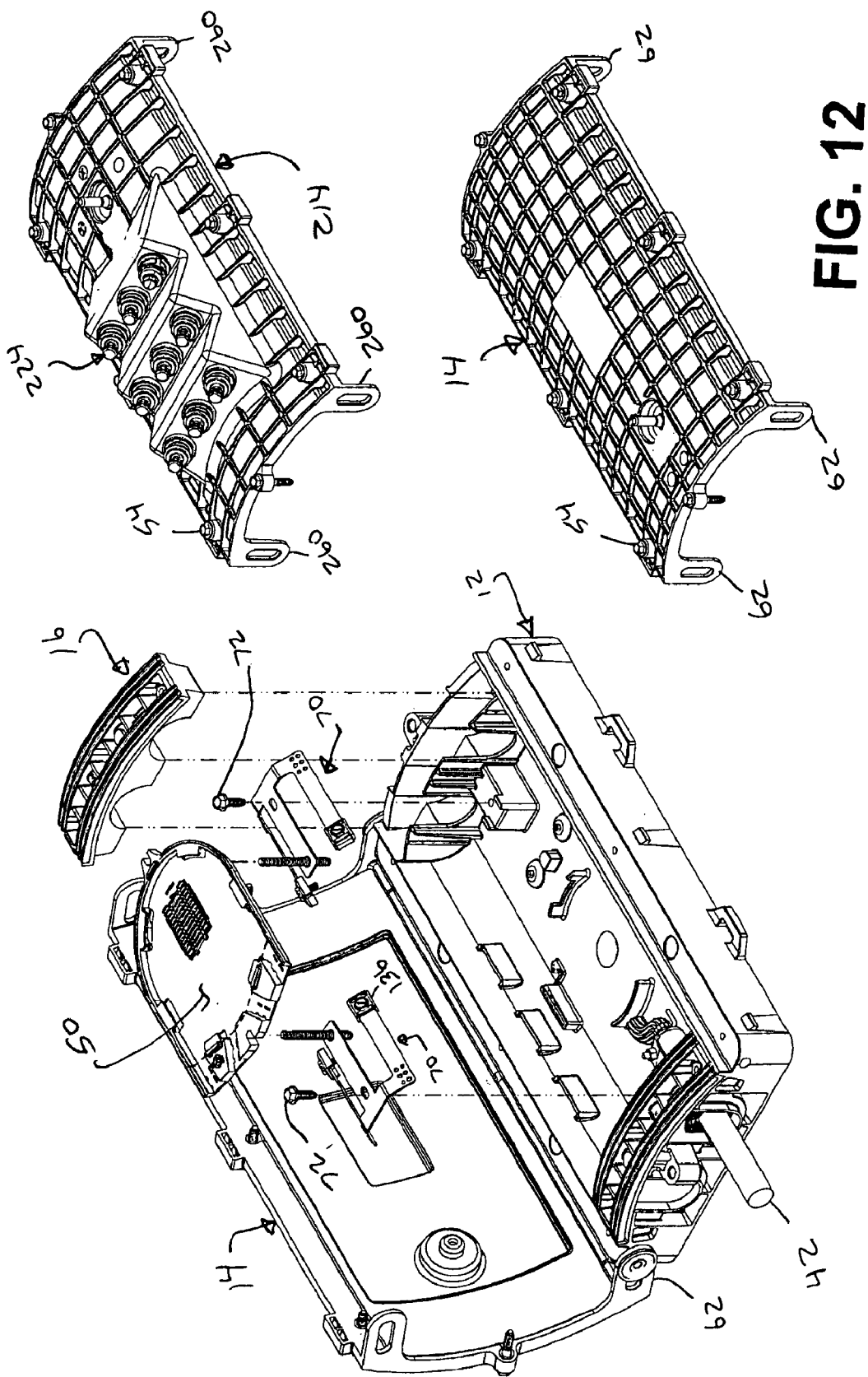
FIG. 12 is an exploded view of the subject convertible housing assembly illustrating interchangeable cover members.

The enclosure base 12 includes fastener holes 100 around a perimeter 102 for the cover member 14 attachment. The perimeter 102 also includes fastener holes 103 for stacking a pair of enclosure bases together, to be described hereinafter. The enclosure base 12 also includes flanges proximal to opposing bulkheads 26, 28 for receiving the end plates 16. The installation of the end plates 16 provides the continuation of a perimeter sealing ring when break out walls or webs 30 are removed. The enclosure base 12 also includes the perimeter sealing ring or rib 90.which compresses against a cover member gasket 106 which can be mounted on the inside of the cover member 14 to form a seal therearound. Referring to FIG. 10, the cover member 14 can include the cover member gasket 106 on the inside of the cover member 14.

The enclosure base 12 can also provide for a base window or opening which can be either molded solid or selectively opened. In the opened arrangement, the base window can provide access between adjacent enclosure bases in an enclosure stack assembly, to be described hereinafter.

Referring again to FIGS. 2, 5, and 6, it is to be appreciated that the restraint brackets 70 include a slotted hole 120 for attachment to the enclosure base 12. The restraint brackets 70 also include bracket legs 122 which can be bent outward to compensate for cable diameter ranges and can retain feeder cables 42 thereon. The restraint brackets 70 also include a plurality of slots 124 for retaining a strap that secures fiber splice trays 50 in the enclosure base 12. The restraint brackets 70 provide support rib or protrusion member 74 that engages a corresponding groove 134 on splice trays 50 thereby increasing their stability within the housing assembly 10. The restraint brackets 70 include a pair of caps 136 for retaining a strength member of the feed cables 42.

Referring now to FIGS. 11-17, a second embodiment of a housing assembly is illustrated. As illustrated therein, a splice case housing assembly 210 adapted for hardened connectors can be configured for butt or in-line configurations. For butt configurations, a closure cover or cover member 214 is arranged to seal against the enclosure base 12 without having an end plate 16 installed. The housing assembly 210 can be reconfigured into an in-line enclosure by adding an end plate 16 to an opposing end of the enclosure base 12 and breaking out a selected number of webs 30 at the respective bulkhead. As will be described in more detail hereinafter, after initial installation of the feed fibers 42 and subsequent splicing to a back side of a hardened connector, the housing assembly 210 does not need to be reopened to provide service to a customer. This feature allows a lesser-trained installer to make the connection to the customer, thus reducing the future installation costs of the service provider.

Figure 13:
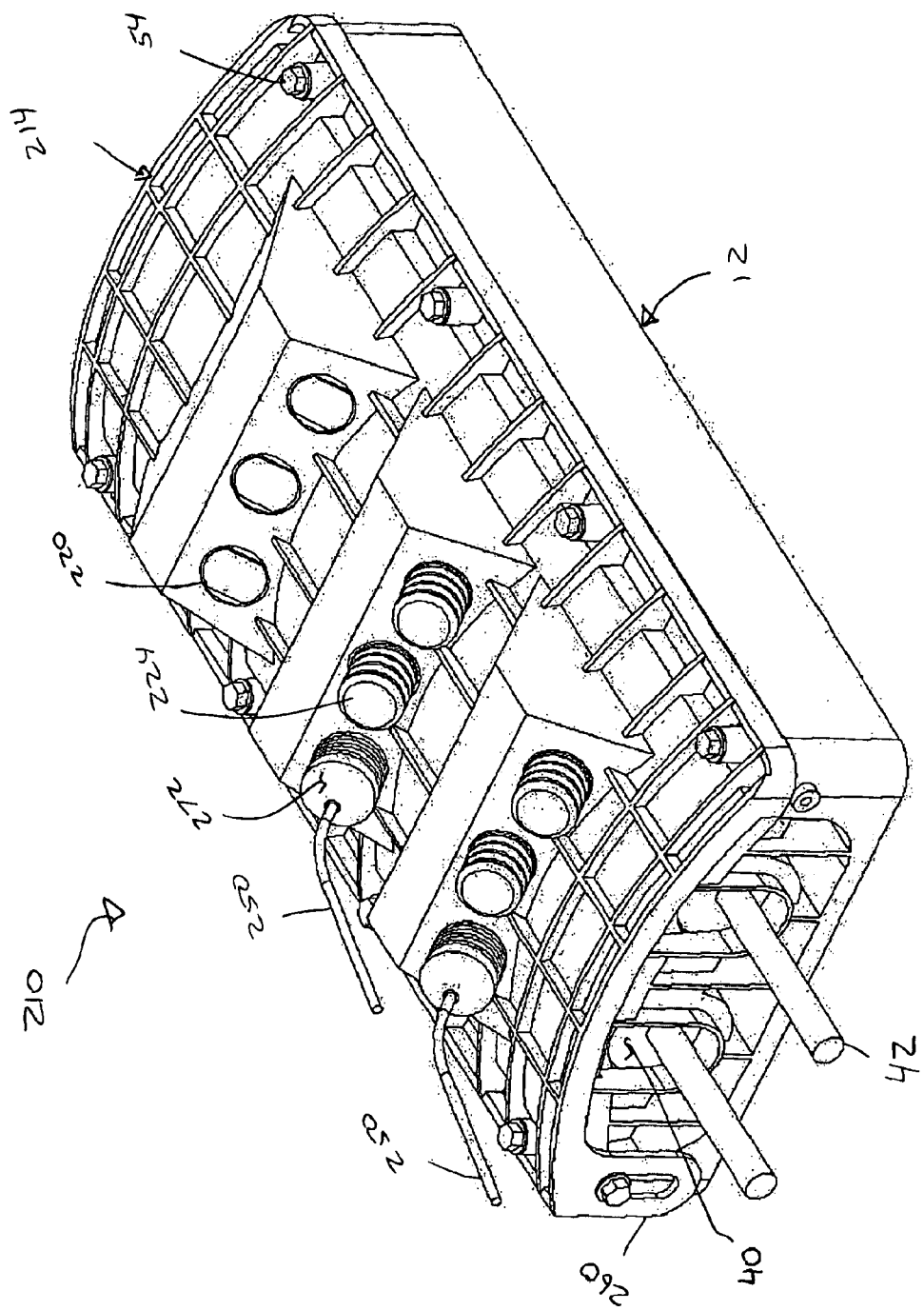
FIG. 13 shows a perspective view of the second embodiment of a housing assembly intended for use with fiber optic cable.
Figure 14:
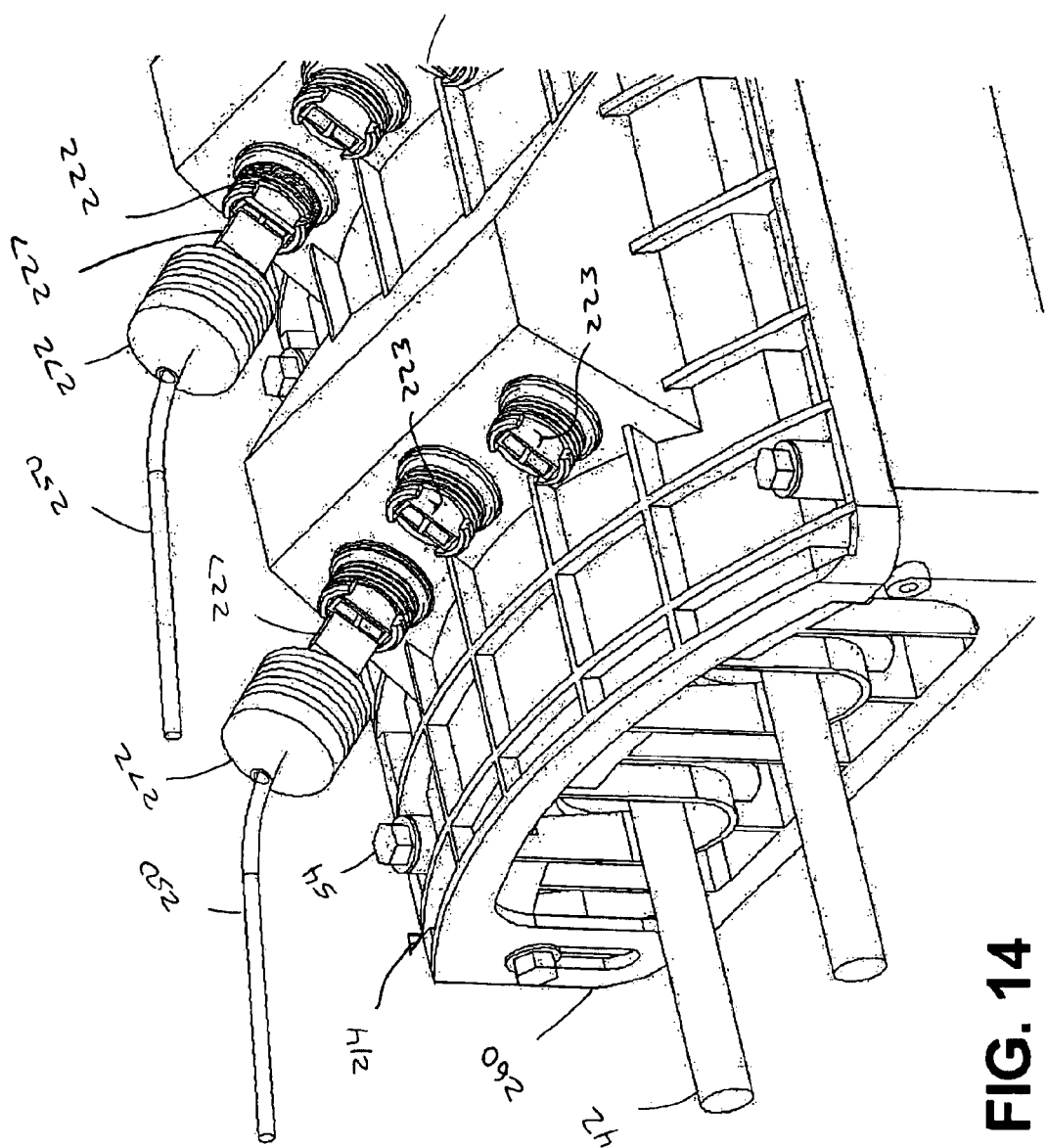
FIG. 14 is an enlarged perspective partial view of the housing assembly of FIG. 13.
Figure 15:
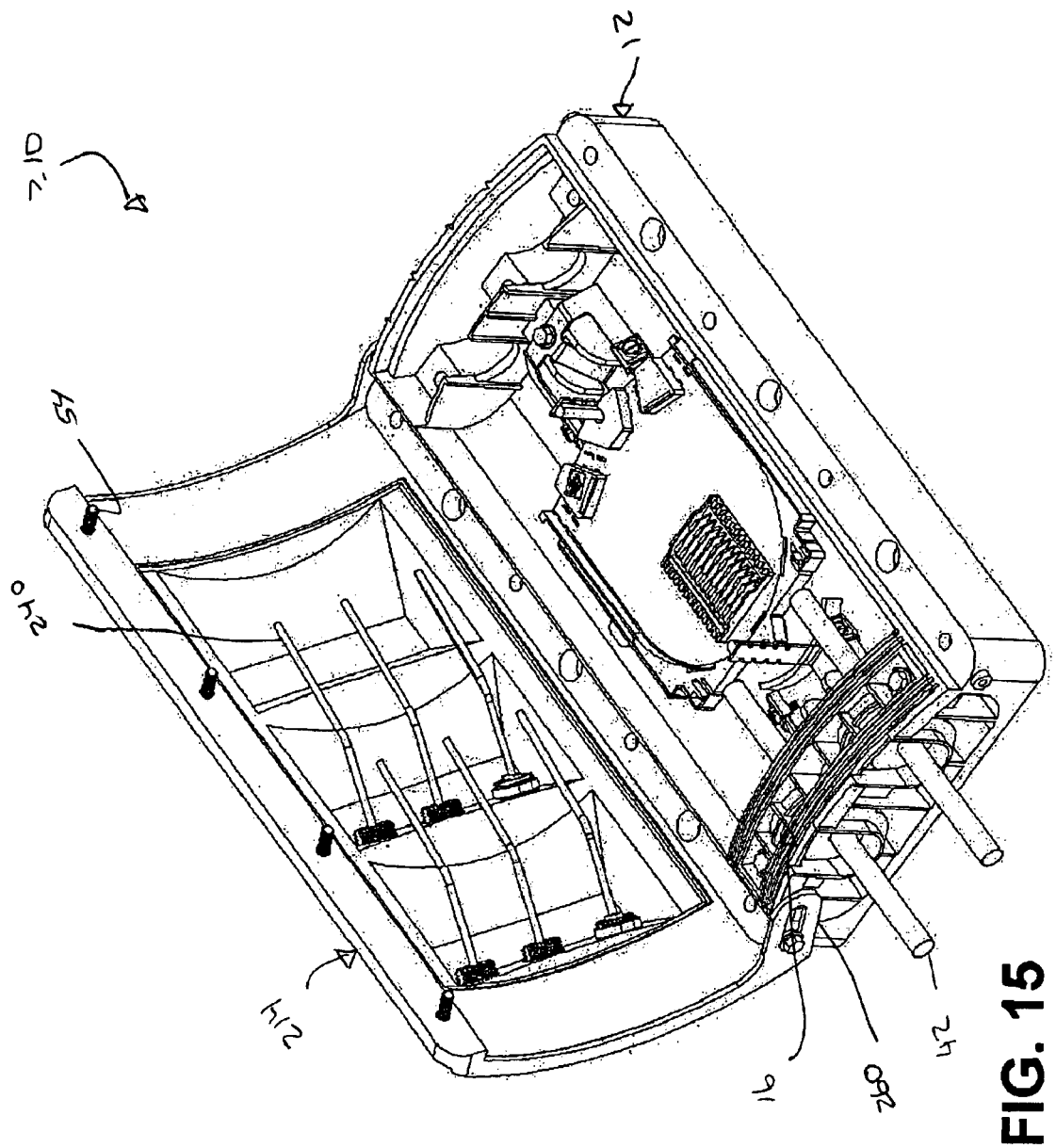
FIG. 15 shows a cover member in the opened position according to the second embodiment.
Figure 16:
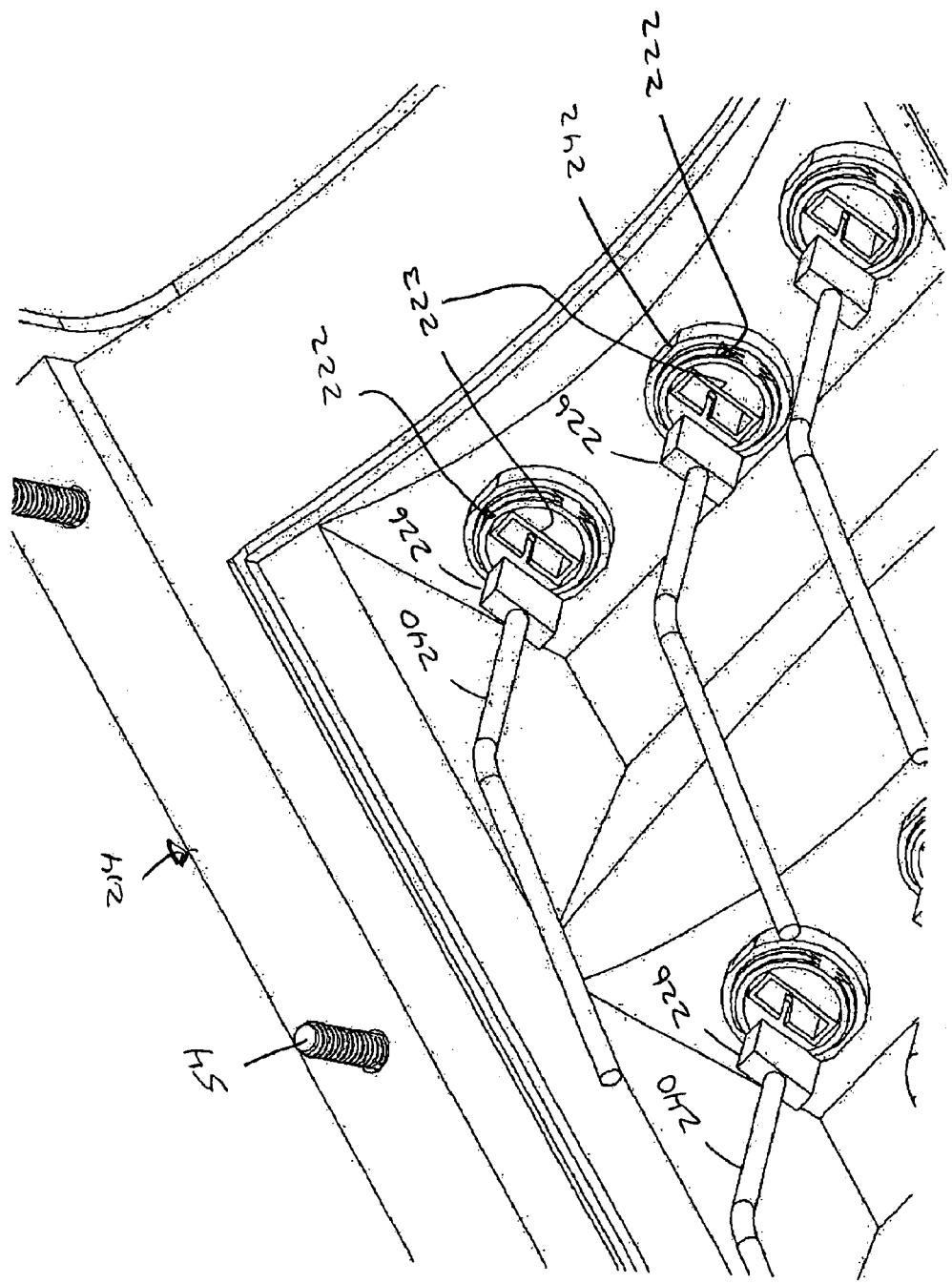
FIG. 16 is an enlarged inside perspective view of a plurality of connector housings according to the second embodiment.

The cover member 214 can include selectively blocked ports or molded over holes 220 adapted to receive connector (adapter) housings or fiber adapters 222. Incoming feed cables 42 can pass through the bulkhead of the enclosure base 12. The connector housings 222 can be covered with protective caps or dust covers 224 until a connection is desired. The protective caps 224 can be factory or field installed. As shown in FIGS. 13 and 14, the connector housings 222 include couplers 223 which are adapted to matingly receive hardened connectors 226, 227. The hardened connectors 227 include a fiber drop wire 250 extending therefrom. Fiber jumpers 240, including connectors 226, can be connected to the back side of the connector housings 222 and routed onto the splice tray for connection to the feed cables 42. As shown in FIGS. 15 and 16, a threaded nut 242 can be provided for securing the connector housing 222 to the cover member 214. It is to be appreciated that the fiber jumpers 240, along with the connectors 226 mounted in connector couplers or feed thru adapter modules 223, allow a signal to flow from the fiber jumper 240 out to the external fiber drop cable 250.

Figure 17:
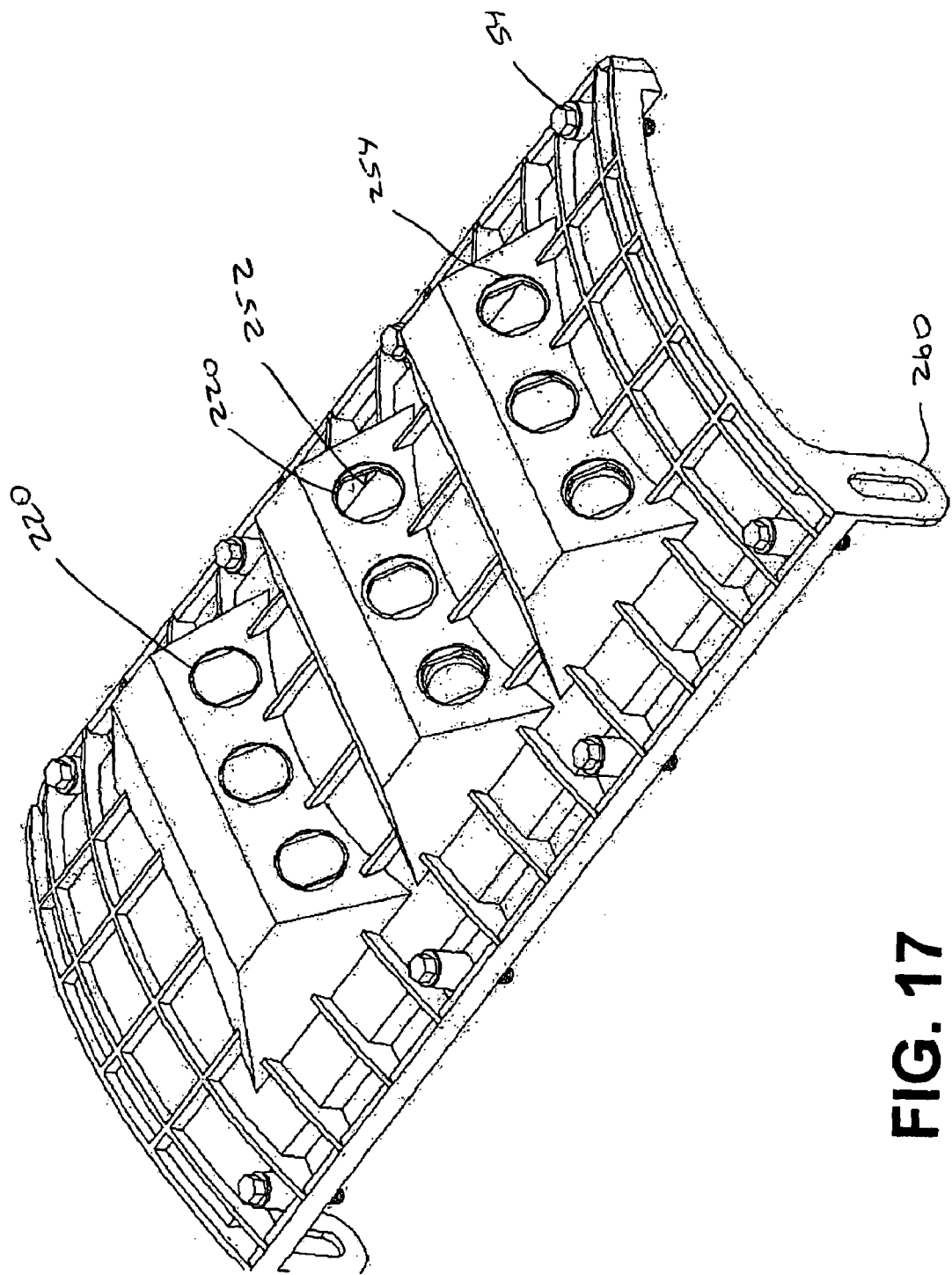
FIG. 17 is a perspective view of the cover member of the housing assembly of FIG. 15 illustrating a pair of hinge legs and holes adapted to receive the enclosure base.

As shown in FIG. 17, the cover member 214 to be used with hardened connectors 226, 227 can include a plurality of holes 220 which can be initially molded over, thereby eliminating the need to supply a connector housing 222 therein. As connectors are needed, the molded over holes 220 can be opened and a connector housing 222 received therein. The holes 220 include flat sides 252 which prevent rotation of the connector housing 222 during installation. The holes 220 can also include a recessed ring 254 for retention of an o-ring (not shown) thereby creating a seal between the connector housing 222 and the cover member 214. The cover member 214 includes a pair of hinge legs 260 at opposing ends of one side, or both sides (not shown), and a plurality of mounting bolts 54 for engaging with the enclosure base 12. The cover member 214 can also include a cover gasket (not shown) mounted to the inside surface of the cover member.

In order to connect the housing assembly 210 to an individual end user, an operator removes one or more of the dust covers 224 from the fiber adapters 222 to expose the fiber connector coupler 223. The operator attaches the drop wire 250 including the hardened connector 227 thereon which has been prefitted with an internally threaded cap 272. It is to be appreciated that the steps to connect an individual end user takes only a matter of minutes and does not disturb the integrity of the enclosure seals. The ease of connection allows an operator with less technical capability to add service (drops) to a plurality of customers in an extremely efficient manner without affecting signals passing through to other customers.

Referring now to FIGS. 18-23, a third embodiment of a splice case housing assembly 300 is illustrated. As illustrated therein, a stacked design is provided which allows for two independent chambers to keep the feed side of the closure protected and/or secured from the installer adding drop fibers to the splice case housing assembly. The stacked design also provides for a secondary chamber which increases the drop capacity of the housing assembly. It is to be appreciated that either cover member 14, 214, described in the first and second embodiments, can be used on either side of the housing assembly 300 which allows the unit to be configured for non-hardened or hardened connectors. Each cover member 14, 214 can have distinctive securing means thereby restricting access to one side of the housing assembly 300 if desired.

Figure 18:
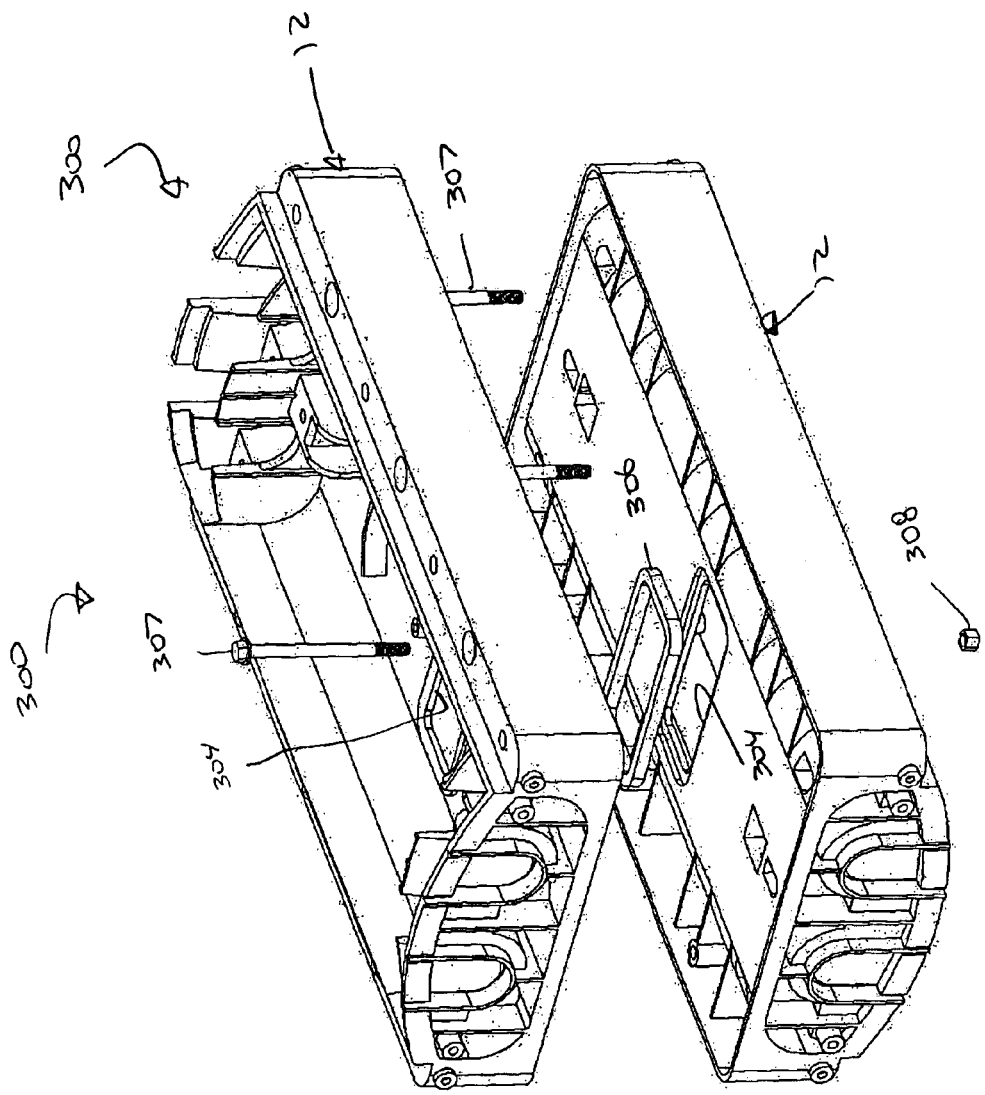
FIG. 18 shows an exploded assembly of two enclosure bases in a relative position just prior to joining according to a third embodiment of the present invention.

Referring now to FIG. 18, a pair of enclosure bases 12 can be assembled together to form a housing assembly with two independent chambers. A base window 304 can be removed to allow for passing of fibers between the opposing chambers. Window gasket 306 can be captured between the enclosure bases 12 to seal the base window 304 openings. Fasteners 307, 308 can be used to secure the enclosure bases 12 together.

Figure 19:
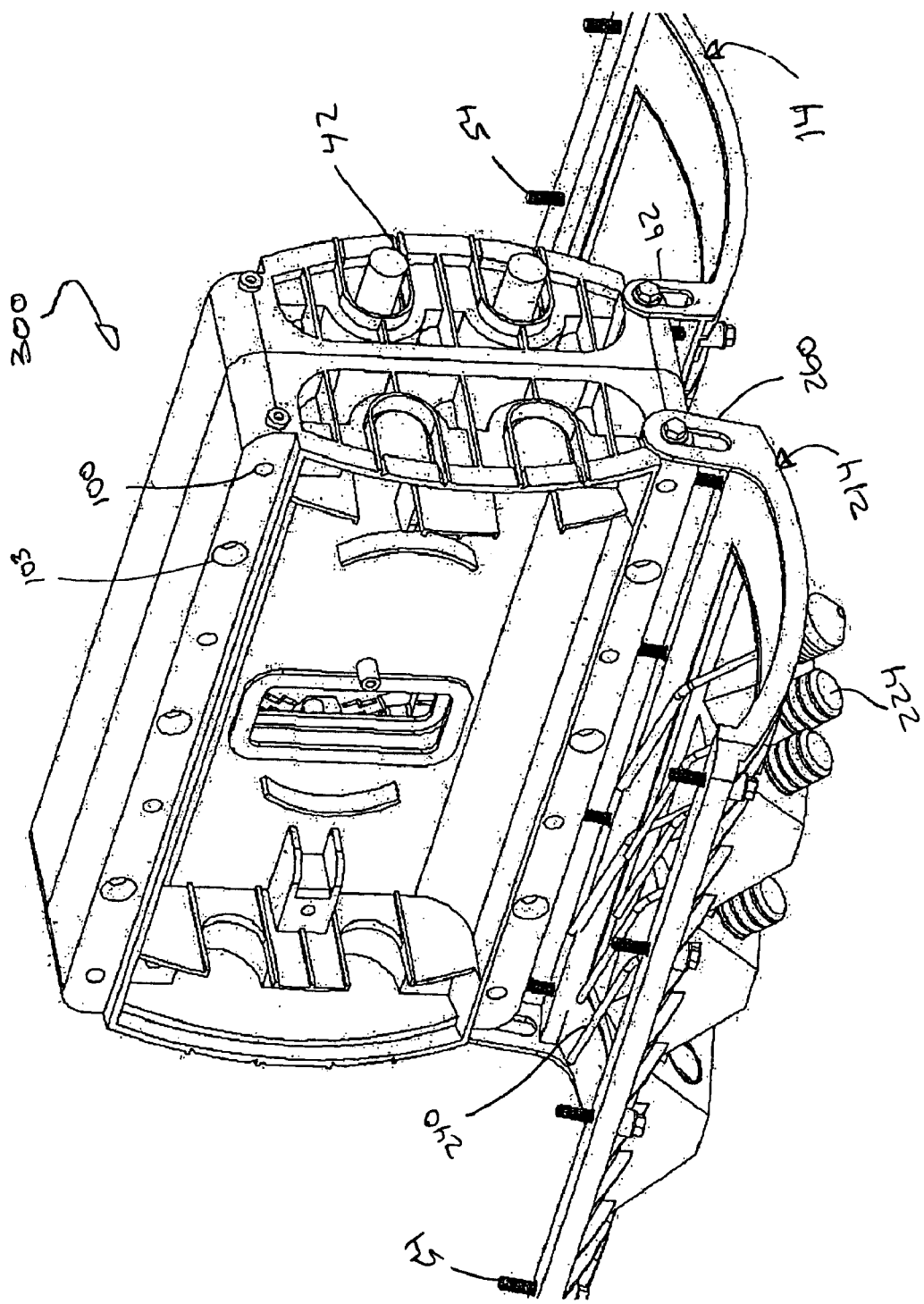
FIG. 19 is a perspective view of a first version of an assembly housing according to the third embodiment of the invention.

Referring now to FIG. 19, a first version of the housing assembly 300 according to the third embodiment is shown. The housing assembly 300 includes independent chambers whereby one chamber accommodates incoming feed cables and a standard cover member 14. The other chamber comprises a drop chamber whereby a cover 214 including hardened connectors is provided.

Figure 20:
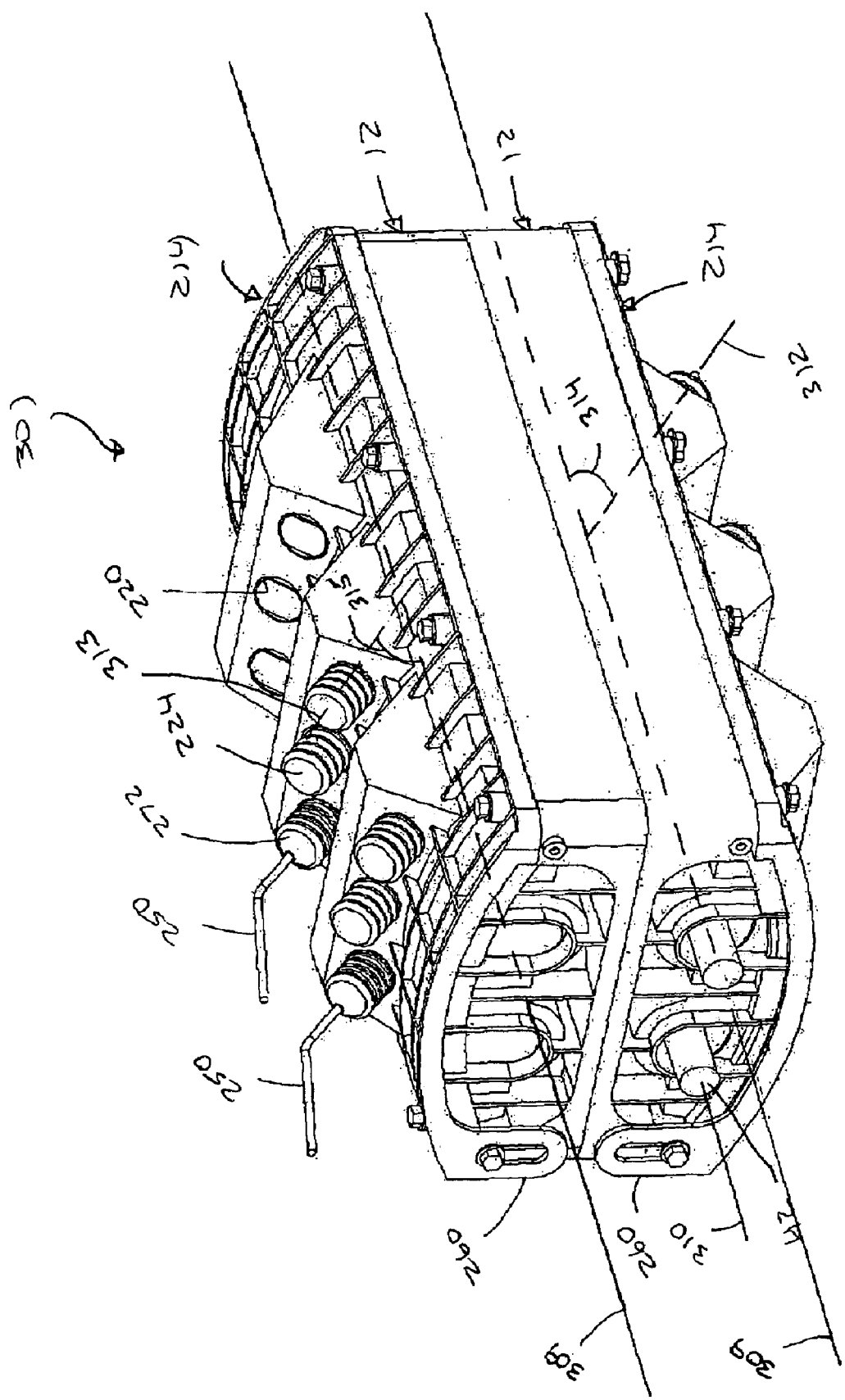
FIG. 20 is a perspective view of a second version of the assembly housing according to the third embodiment.

FIG. 20 illustrates a second version whereby the housing assembly 301 includes a pair of cover members 214 in which both plates accommodate hardened connectors. By providing hardened connectors on both cover members 214, an increase in drop capacity is provided. The enclosure bases 12 can be elongate defining a longitudinal axis 309 therethrough. A first set of bulkhead ports can be adapted to receive an associated first cable into the enclosure along a first insertion axis 310. A second set of bulkhead ports can be adapted to receive an associated second cable into the enclosure along a second insertion axis. The first insertion axis and the second insertion axis can be generally parallel to and offset from the longitudinal axis 309 defined by the enclosure base 12.

As best shown in FIG. 20, it is to be appreciated that each cover 214 can be adapted to receive cables into the enclosure along third and fourth insertion axes 312, 313, respectively. The third insertion axis forms an angle 314 less than 90 degrees relative to the longitudinal axis 309 defined by its associated enclosure base. As shown, the angle is about 45 degrees. Similarly, the fourth insertion axis forms an angle 315 less than 90 degrees relative to the longitudinal axis 309 defined by its associated enclosure base. Also as shown, the angle is about 45 degrees. It is to be appreciated that the third insertion axis 312 is generally parallel to the fourth insertion axis 313. The adapter housings can generally be arranged in rows and/or columns relative to the longitudinal axis 309.

Figure 21:
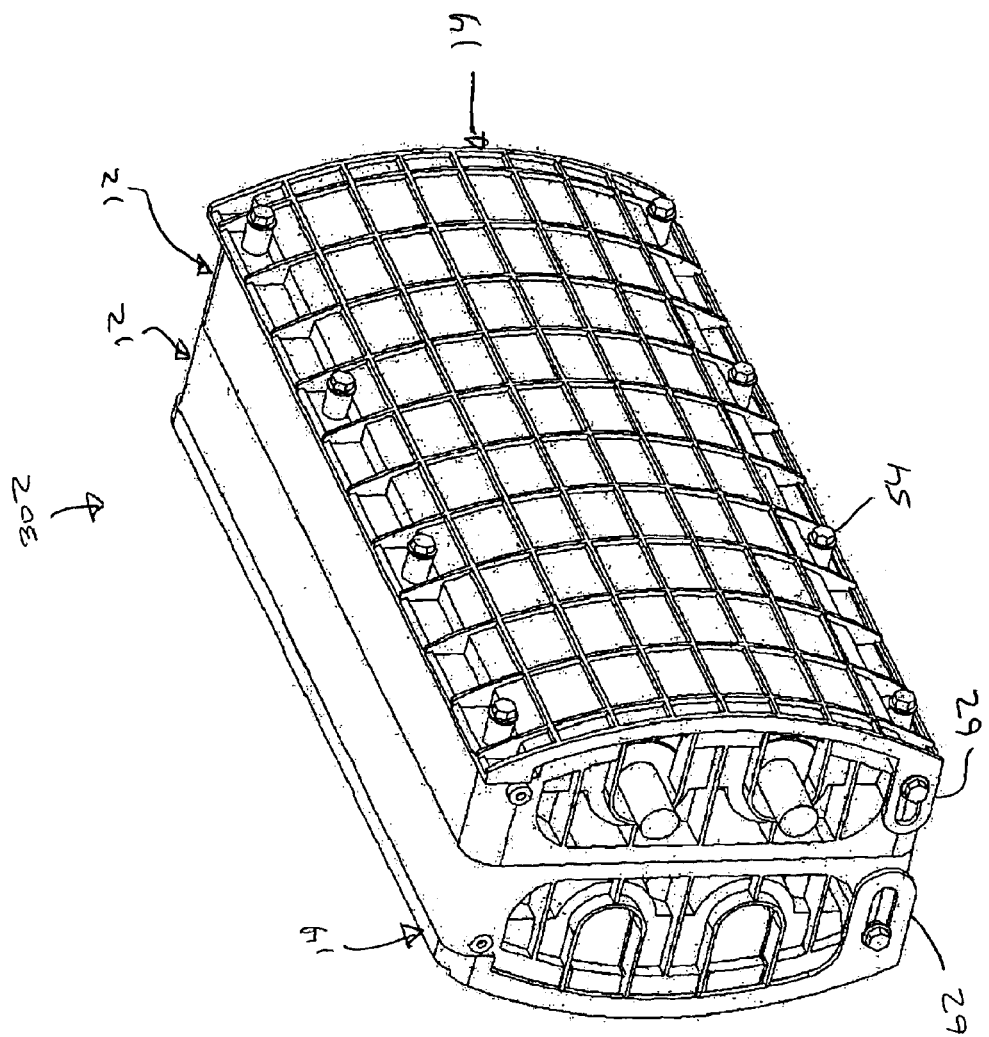
FIG. 21 is a perspective view of a third version of the assembly housing according to the third embodiment.
Figure 22:
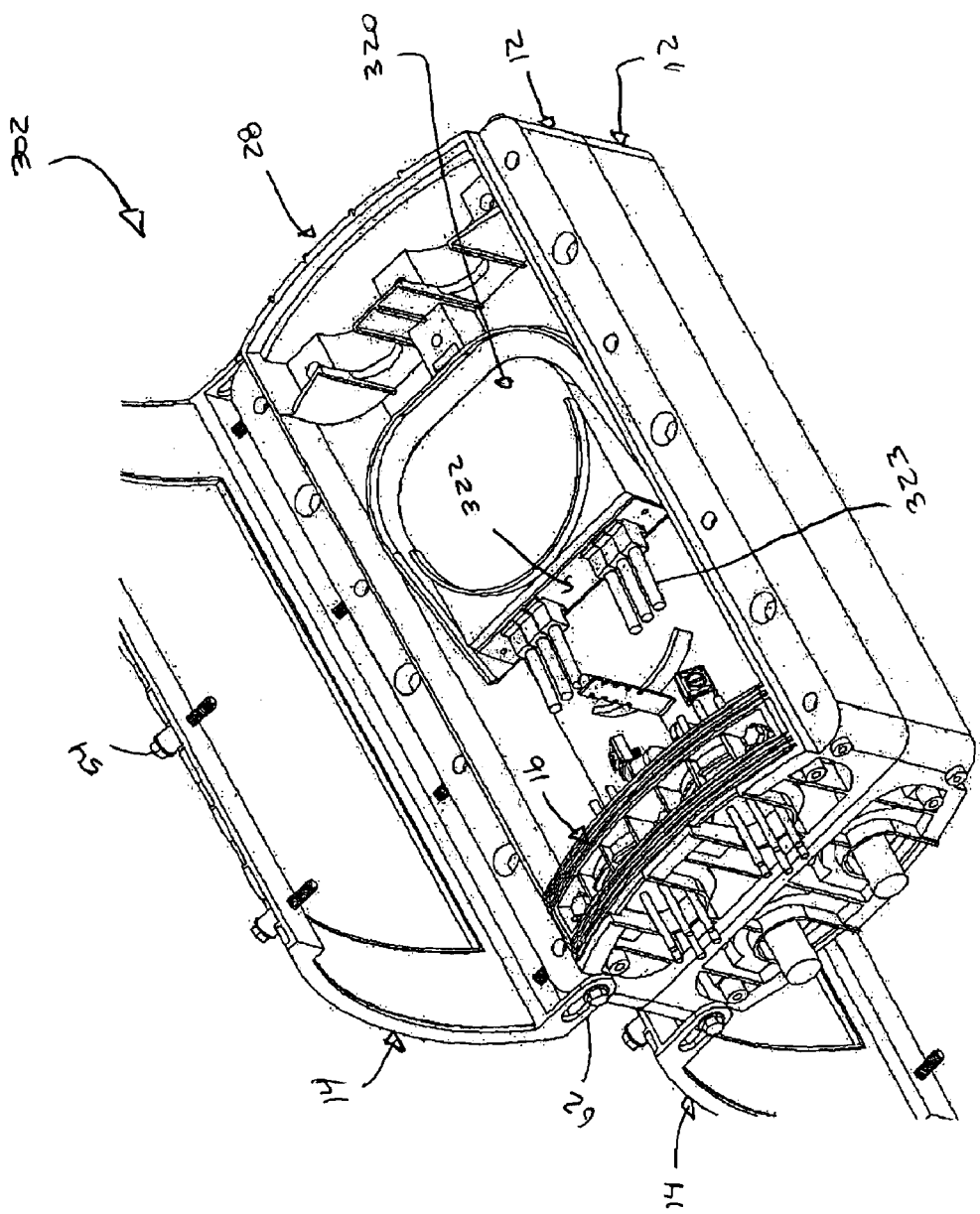
FIG. 22 is a top perspective view of the assembly housing of FIG. 21.
Figure 23:
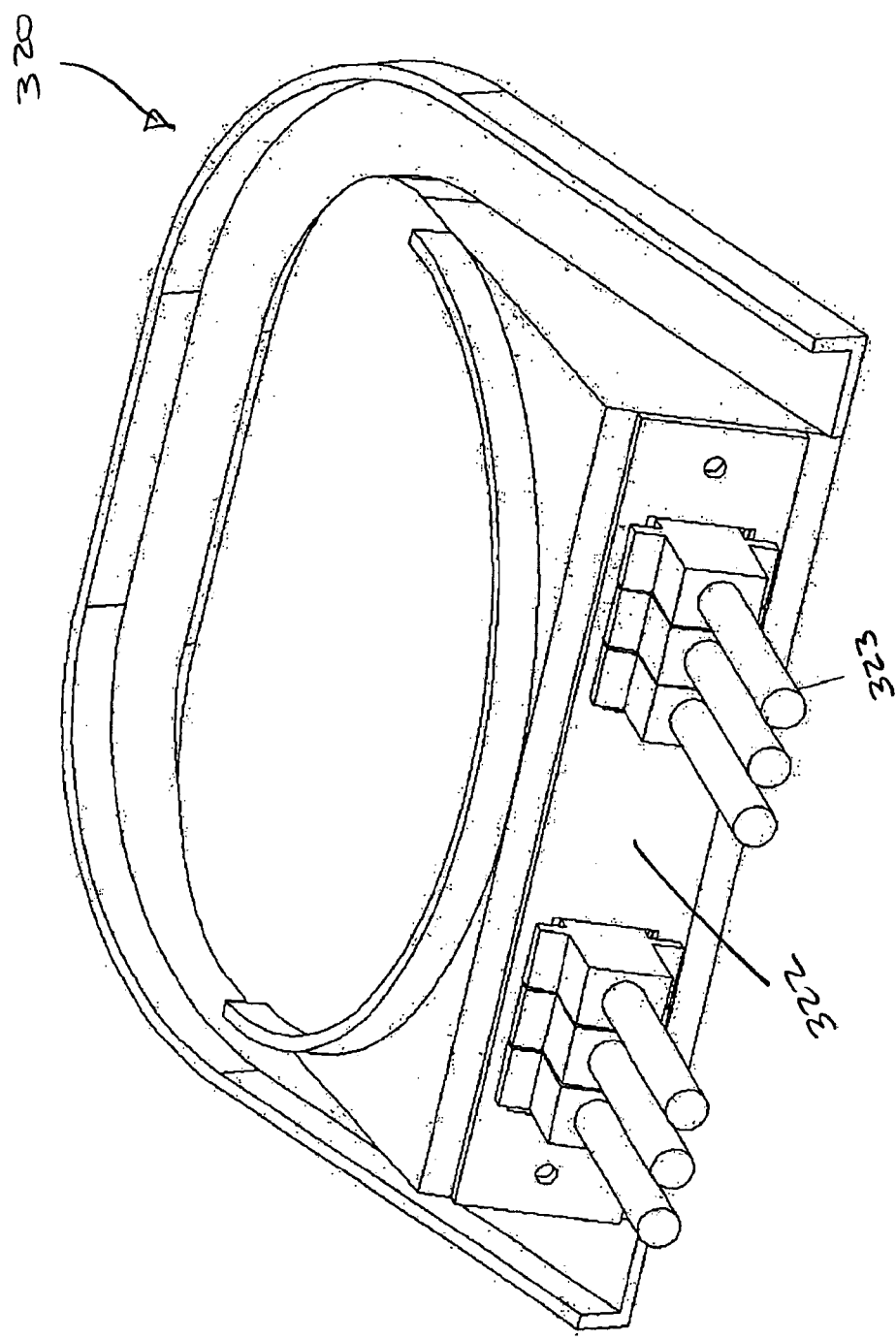
FIG. 23 is an enlarged perspective view of a shroud adapted to be used with non-hardened connectors.

Referring now to FIGS. 21-23, a splice case housing assembly 302 including a pair of enclosure bases 12 is illustrated and is adapted for non-hardened connectors. This embodiment allows for standard drop wire to be used for the outgoing drops. Also, this embodiment allows for a higher quantity of drop wire to exit the drop chamber versus the hardened connector version. In particular, the housing assembly 302 includes standard cover members 14 mounted on opposing sides of the pair of enclosure bases. Two independent chambers are formed, namely a drop chamber and a feed chamber. Incoming feed cables can be supplied through one of the enclosure bases. The incoming feed fibers can be spliced to fiber jumpers on the splice tray (not illustrated). Once spliced, the fiber jumpers can be routed through the base window into the drop chamber and connected to the back of the bulkhead plate. A shroud 320, including a bulkhead plate 322, is provided, thereby creating an area to splice fiber jumpers 323 to the outgoing fiber drops. The outgoing fiber drops are routed through apertures in the grommet and extend through the bulkhead of one of the enclosure bases 12.

As shown in FIG. 22, the shroud 320 covers the base window on the drop chamber side, thereby preventing tampering with a feed signal connection.

Obviously, modifications and alterations will occur to others upon a reading and understanding of this specification. It is intended that the invention be construed as including all such modifications and alterations as fall within the scope of the appended claims or the equivalents thereof.

The invention claimed is:

1. A method for connecting an optical fiber to a plurality of end users, the method comprising the steps of:
   providing at least one optical fiber enclosure base having at least one hingedly retained cover member for accessing a chamber and at least one end plate;
   providing the at least one cover member with a plurality of fiber adapters, the fiber adapters include connector couplers therein;
   pivoting the at least one cover member and installing a feeder cable through at least one bulkhead in the chamber;
   connecting the connector couplers on one side of the at least one cover with the splicing tray via a plurality of fiber jumpers;
   installing a plurality of dust covers on the other side of the at least one cover to the fiber adapters;
   replacing the at least one cover member;
   removing a selected number of dust covers from selected fiber adapters to expose a selected number of connector couplers;
   attaching a selected number of drop wires to the selected connector couplers; and,
   providing another cover member, said another cover member includes a plurality of selectively blocked ports for receiving fiber adapters for housing said connector couplers.

2. The method of claim 1, further comprising the step of:
   providing the at least one cover member includes providing a plurality of selectively blocked ports for receiving fiber adapters for housing said connector couplers.

3. The method of claim 2, further comprising the step of:
   providing the cover ports includes providing at least one flat side for preventing rotation of the fiber adapters therein.

4. The method of claim 2, further comprising the step of:
   providing the cover ports includes providing a recessed ring, the recessed ring includes an o-ring retained therein for creating a seal between the fiber adapters and the at least one cover member.

5. The method of claim 1, further comprising the step of:
connecting a first hardened connector and a second hardened connector to the connector couplers.

6. The method of claim 5, further comprising the step of:
connecting at least one of the first and second hardened connectors includes providing internally threaded caps for mating with the fiber adapters.

7. The method of claim 5, further comprising the step of:
connecting at least one of the first and second hardened connectors includes providing a fiber drop wire extending therefrom.

8. A method for connecting an optical fiber to a plurality of end users, the method comprising the steps of:
providing at least one optical fiber enclosure base having at least one hingedly retained cover member for accessing a chamber and at least one end plate;
providing the at least one cover member with a plurality of fiber adapters, the fiber adapters include connector couplers therein;
pivoting the at least one cover member and installing a feeder cable through at least one bulkhead in the chamber;
connecting the connector couplers on one side of the at least one cover with the splicing tray via a plurality of fiber jumpers;
installing a plurality of dust covers on the other side of the at least one cover to the fiber adapters;
replacing the at least one cover member;
removing a selected number of dust covers from selected fiber adapters to expose a selected number of connector couplers;
attaching a selected number of drop wires to the selected connector couplers;
providing the at least one cover member includes providing a plurality of selectively blocked ports for receiving fiber adapters for housing said connector couplers; and,
providing another cover member, said another cover member includes a plurality of selectively blocked ports for receiving fiber adapters for housing said connector couplers.

9. A method for connecting an optical fiber to a plurality of end users, the method comprising the steps of:
providing at least one optical fiber enclosure base having at least one hingedly retained cover member for accessing a chamber and at least one end plate;
providing the at least one cover member with a plurality of fiber adapters, the fiber adapters include connector couplers therein;
pivoting the at least one cover member and installing a feeder cable through at least one bulkhead in the chamber;
connecting the connector couplers on one side of the at least one cover with the splicing tray via a plurality of fiber jumpers;
installing a plurality of dust covers on the other side of the at least one cover to the fiber adapters;
replacing the at least one cover member;
removing a selected number of dust covers from selected fiber adapters to expose a selected number of connector couplers;
attaching a selected number of drop wires to the selected connector couplers; and,
providing another optical fiber enclosure base wherein at least one of the enclosure bases includes a bulkhead at one end having a plurality of selectively removable webs defining a series of ports therein for selectively receiving incoming feed cables therethrough.

10. A method is provided for connecting fibers to a plurality of associated end users, the method comprising the steps of:
providing a fiber splice case having a first enclosure base and a second enclosure base coupled with and adjacent to said first enclosure base;
providing a first cover member hingedly retained to said first enclosure base, said first cover selectively sealingly engaged with an exterior side of said first enclosure base;
providing a second cover member hingedly retained to said second enclosure base, said second cover selectively sealingly engaged with an exterior side of said second enclosure base;
forming a drop chamber between said first cover member and said first base and forming a feed chamber between said second cover member and said second enclosure base, said first enclosure base and said second enclosure base include a window therebetween for providing fluid communication between said feed chamber and said drop chamber;
supplying incoming feed cables through said second enclosure base;
splicing said feed cables to fiber jumpers;
routing said fiber jumpers through said window into said drop chamber;
splicing said fiber jumpers to outgoing fiber drops; and,
routing said outgoing fiber drops through a bulkhead of said first enclosure base.

11. The method according to claim 10, wherein said splicing said feed cables to said fiber jumpers includes a splice tray and further comprises the step of connecting said fiber jumpers to a bulkhead plate.

12. The method according to claim 11, wherein said routing of said fiber drops through said bulkhead further comprises extending said fiber drops through apertures in a grommet positioned in said bulkhead.

13. The method of claim 10, wherein at least one of said first and said second cover members include selectively blocked ports for receiving associated adapter housings therethrough.

14. A method for connecting an optical fiber to a plurality of end users, the method comprising the steps of:
providing at least one optical fiber enclosure base having at least one hingedly retained cover member for accessing a chamber and at least one end plate, said at least one cover member selectively sealingly engaged with an exterior side of said at least one enclosure base;
providing said at least one cover member with a plurality of fiber adapters, the fiber adapters include connector couplers therein;
pivoting said at least one cover member and installing a feeder cable through at least one bulkhead in the chamber;
connecting said connector couplers on one side of said at least one cover with said splicing tray via a plurality of fiber jumpers;
installing a plurality of dust covers to said plurality of fiber adapters on the other side of said at least one cover member;
replacing the at least one cover member;
removing a selected number of dust covers from selected fiber adapters to expose a selected number of connector couplers;
attaching a selected number of drop wires to the selected connector couplers; and, providing another optical fiber enclosure base wherein at least one of the enclosure bases includes a bulkhead at one end having a plurality of selectively removable webs defining a series of ports therein for selectively receiving incoming feed cables therethrough.

15. The method of claim 14, wherein said providing at least one cover member includes providing a plurality of selectively blocked ports for receiving said fiber adapters for housing said connector couplers.

16. The method of claim 14, further comprising: connecting a first hardened connector and a second hardened connector to the connector couplers.

17. A method for connecting an optical fiber to a plurality of end users, the method comprising the steps of:
  providing at least one optical fiber enclosure base having at least one hingedly retained cover member for accessing a chamber and at least one end plate, said at least one cover member selectively sealingly engaged with an exterior side of said at least one enclosure base;
  providing said at least one cover member with a plurality of fiber adapters, the fiber adapters include connector couplers therein;
  pivoting said at least one cover member and installing a feeder cable through at least one bulkhead in the chamber;
  connecting said connector couplers on one side of said at least one cover with said splicing tray via a plurality of fiber jumpers;
  installing a plurality of dust covers to said plurality of fiber adapters on the other side of said at least one cover member;
  replacing the at least one cover member;
  removing a selected number of dust covers from selected fiber adapters to expose a selected number of connector couplers;
  attaching a selected number of drop wires to the selected connector couplers; and,
  providing another cover member and another optical fiber enclosure base, said another cover member selectively sealingly engaged with an exterior side of said another enclosure base, said another cover member including a plurality of selectively blocked ports for receiving fiber adapters for housing said connector couplers.

18. The method of claim 17, wherein said providing at least one of the enclosure bases includes providing a bulkhead at one end having a plurality of selectively removable webs defining a series of ports therein for selectively receiving incoming feed cables therethrough.

* * * * *